(12) United States Patent
Eisen et al.

(10) Patent No.: US 6,848,044 B2
(45) Date of Patent: Jan. 25, 2005

(54) CIRCUITS AND METHODS FOR RECOVERING LINK STACK DATA UPON BRANCH INSTRUCTION MIS-SPECULATION

(75) Inventors: Lee Evan Eisen, Austin, TX (US); James Allan Kahle, Austin, TX (US); Balaram Sinharoy, Poughkeepsie, NY (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 09/801,608

(22) Filed: Mar. 8, 2001

(65) Prior Publication Data

US 2002/0129226 A1 Sep. 12, 2002

(51) Int. Cl.[7] .............................................. G06F 15/00
(52) U.S. Cl. ...................................... 712/228; 712/237
(58) Field of Search ................................. 712/228, 242, 712/233, 234, 239, 230, 237; 711/213, 100, 132

(56) References Cited

U.S. PATENT DOCUMENTS 5,574,927 A * 11/1996 Scantlin ........................ 712/41
6,157,999 A * 12/2000 Rossbach et al. ........... 712/243
6,526,503 B1 * 2/2003 Sinharoy ..................... 712/242
6,633,974 B1 * 10/2003 Sinharoy ..................... 712/237

* cited by examiner

Primary Examiner—Henry W. H. Tsai
(74) Attorney, Agent, or Firm—Richard F. Frankeny; Winstead Sechrest & Minick P.C.; Mark E. McBurney

(57) ABSTRACT

A method of performing operations to a link stack including the step of performing a Pop operation from the link stack which includes the substeps of storing a first pointer value to the link stack, the first pointer value being the value of a pointer to the link stack before the Pop operation, and storing a first address including a first tag popped from the link stack. The method further includes the step of performing a Push operation to the link stack which includes the substeps of storing a second address including a second tag being Pushed into the link stack and storing a second pointer to the link stack, the second pointer being the value of the pointer to the link stack after the Push operation. The method additionally provides for the recovering of the link stack following an instruction flush which includes the substeps of comparing the first pointer value and the second value, comparing the first tag and the second tag, and replacing an address at the top of the link stack with the first address when the first and second pointers match and the first and second tags match.

19 Claims, 22 Drawing Sheets

CIRCUITS AND METHODS FOR RECOVERING LINK STACK DATA UPON BRANCH INSTRUCTION MIS-SPECULATION

TECHNICAL FIELD

The present invention relates generally to speculative computer instruction execution and in particular to circuits and methods for recovering link stack data upon branch instruction mis-speculation.

BACKGROUND INFORMATION

Modern high-frequency microprocessors are typically deeply pipelined devices. For efficient instruction execution in these machines, instructions are fetched and executed speculatively. In other words, a prediction is made as to the future need of a given instruction and that instruction is then fetched into the instruction pipeline many cycles before its predicted execution. Later, when the instruction is required, it is already available in the pipeline and can be immediately executed, otherwise, the instruction is flushed and the machine retrieves the appropriate instruction from the instruction cache.

Often there are one or more branches ( some of which may be subroutine calls and returns) between the instructions that are being fetched and the instructions that are being executed in the processor execution units. Therefore, to handle subroutine calls and returns efficiently, many high frequency microprocessors employ a link stack. On a subroutine call, the address of the following instruction is "pushed" into the stack while on a subroutine return, the contents at the top of the stack (which is expected to contain the address of the instruction following the original subroutine call) are "popped" from the stack. Since pushing and popping from a hardware stack can normally be done when the branch is fetched, which occurs several cycles before the corresponding branches are executed in a deeply pipelined processor, such a linked stack mechanism helps implement the instruction fetching scheme across subroutine calls and returns to a great extent. Notwithstanding, the link stack can become corrupted during the process of speculative instruction fetching and execution.

Consider, for example, the case where a subroutine call is performed using a "branch and link instruction" and a return from the subroutine is achieved using a "branch to link register" or "BrLR" instruction. It may happen that a BrLR instruction, which for example returns to a location "A", is fetched speculatively followed by a speculative fetch of a "branch and link" instruction, for example from call-site B. The link stack is updated at fetch time, such that after these instructions are fetched, the address location "A" is replaced by the address location "B+4" (each instruction consisting of four bytes, for example) at the top of the link stack. Since both the BrLR and "branch and link" instructions are speculatively fetched, they may not ultimately be in the actual execution path. If these instructions are not in fact in the actual execution path (in which case the instructions are flushed out), the link stack becomes corrupted.

Generally, anytime one or more BrLR instructions are followed by one or more "branch and link" instructions in the speculated path, the link stack becomes corrupted if the speculation turns out to be wrong. For a commercial programming workload, about 2% of the instructions are BrLR instructions and therefore it becomes very important to be able to predict the target address for these instructions with a good degree of accuracy in deeply pipelined machines. Thus, there exists a need for circuits, systems and methods to detect link stack corruption, as well as to recover a link stack from a corrupted condition. Since methods already exist to deal with mis-predictions in speculative instructions, the circuits, systems and methods used to deal with link stack corruption in these cases are not put in place to insure correct functional behavior, but rather, to improve execution speed. Various degrees of link stack corruption may occur on mis-predictions in speculative instruction execution and the better the recovery the less system speed will be degraded.

SUMMARY OF THE INVENTION

The present inventive principles are embodied in methods of performing operations to a link stack. When a Pop operation is performed from the link stack, a first pointer value to the link stack, the first pointer value being the value of the pointer to the link stack before the Pop operation, is stored along with a first address including a first tag popped from the link stack. When a Push operation is performed to the link stack, a second address including a second tag being Pushed into the link stack is stored along with a second pointer to the link stack, the second pointer being the value of the pointer to the link stack after the Push operation. The link stack can then be selectively recovered after an instruction flush by comparing the first and second pointer values and the first and the second tags. An address at the top of the link stack is then replaced with the stored first address when the first and second pointers match and the first and second tags match.

Another embodiment of the present invention tracks the operation of a link stack in a tracking queue containing and operation field and a corresponding link stack pointer field. A first register stores a link stack correction address and a second register stores a correction link stack pointer and a third register stores a Boolean value as the result of a Push operation and a Deallocate operation. The Boolean value is set and tested during Pop, Push and Flush operations on the link stack. In this embodiment both the link stack entry and a corresponding link stack pointer may be corrected.

The present inventive principles provide a simple mechanism for recovering a link stack after a sequence of Pop and Push operations. Specifically, the amount and complexity of the necessary circuitry are minimal which makes implementation of these principles relatively easy and inexpensive.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
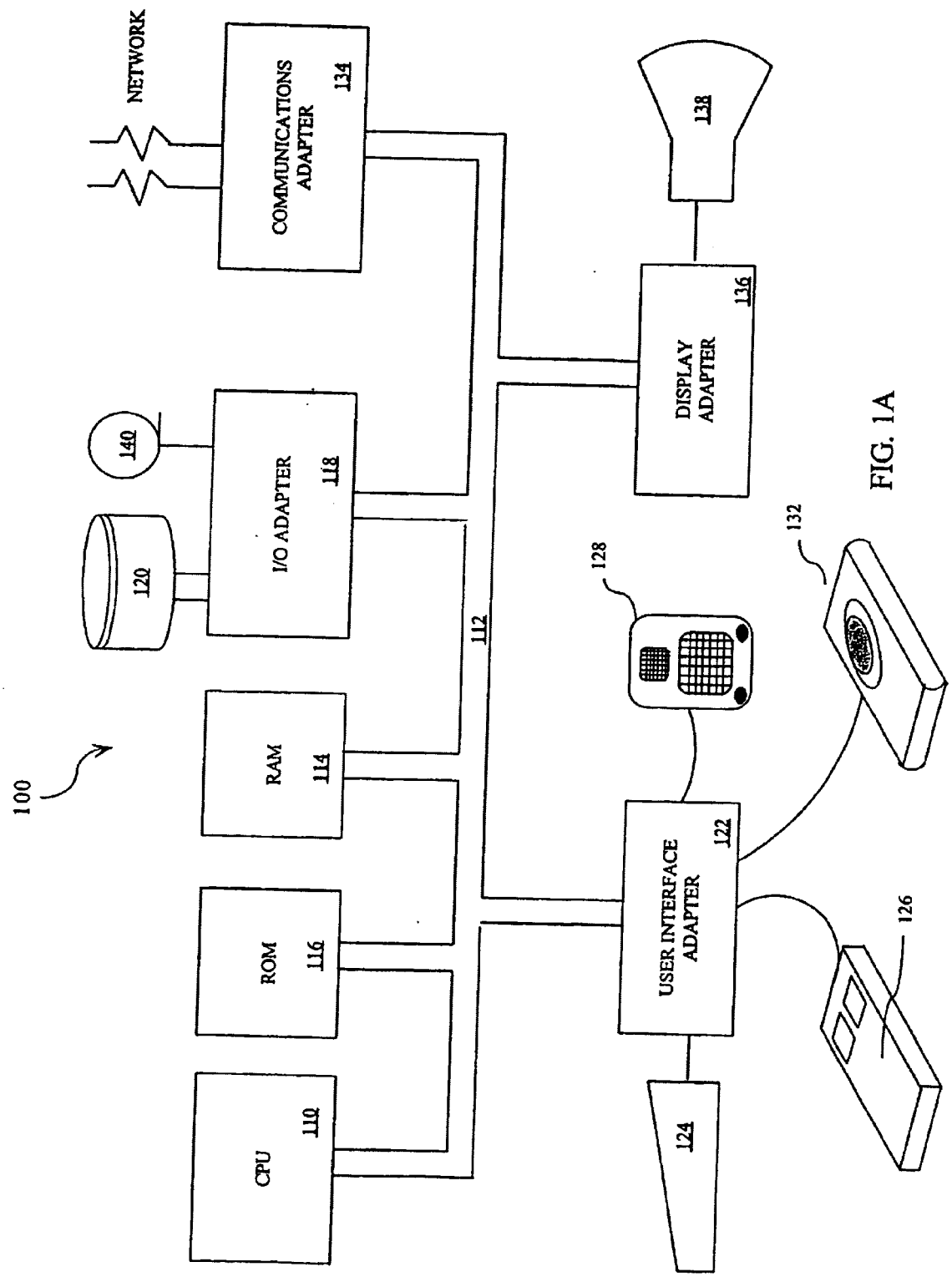
FIG. 1A is a high level functional block diagram of a representative data processing system suitable for practicing the principles of the present invention.

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

All such variations are intended to be included within the scope of the present invention. It will be recognized that, in the drawings, only those signal lines and processor blocks necessary for the operation of the present invention are shown.

Referring to the drawings, depicted elements are not necessarily shown to scale, and like or similar elements are designated by the same reference numeral through the several views.

Refer now to FIG. 1A which is a high level functional block diagram of a representative data processing system 100 suitable for practicing the principles of the present invention. Data processing system 100 includes a central processing system (CPU) 110 operating in conjunction with a system bus 112. CPU 110 may be a reduced instruction set computer (RISC), such as an IBM POWER Processor, or a complex instruction set computer (CISC). System bus 112 operates in accordance with a standard bus protocol, such as the ISA protocol, compatible with CPU 110.

CPU 110 operates in conjunction with read-only memory (ROM) 116 and random access memory (RAM) 114. Among other things, ROM 116 supports the basic input output system (BIOS). RAM 114 includes, for example, DRAM (Dynamic Random Access Memory) system memory and SRAM (Static Random Access Memory) external cache.

I/O Adapter 118 allows for an interconnection between the devices on system bus 112 and external peripherals, such as mass storage devices (e.g., a hard drive, floppy drive or CD/ROM drive), or a printer. A peripheral device 120 is, for example, coupled to a peripheral control interface (PCI) bus, and I/O adapter 118 therefore may be for example PCI bus bridge. User interface adapter 122 couples various user input devices, such as keyboard 124, mouse 126, touchpad 132 or speaker 128 to the processing devices on bus 112. Display adapter 136 supports a display 138 which may be for example a cathode ray tube (CRT), liquid crystal display (LCD) or similar conventional display unit. Display adapter 136 may include among other things a conventional display controller and frame buffer memory.

System 100 can be selectively coupled to a computer or telecommunications network through communications adapter 134. Communications adapter 134 may include, for example, a modem for connection to a telecommunications network and/or hardware and software for connecting to a computer network such as a local area network (LAN) or wide area network (WAN).

Figure 1B:
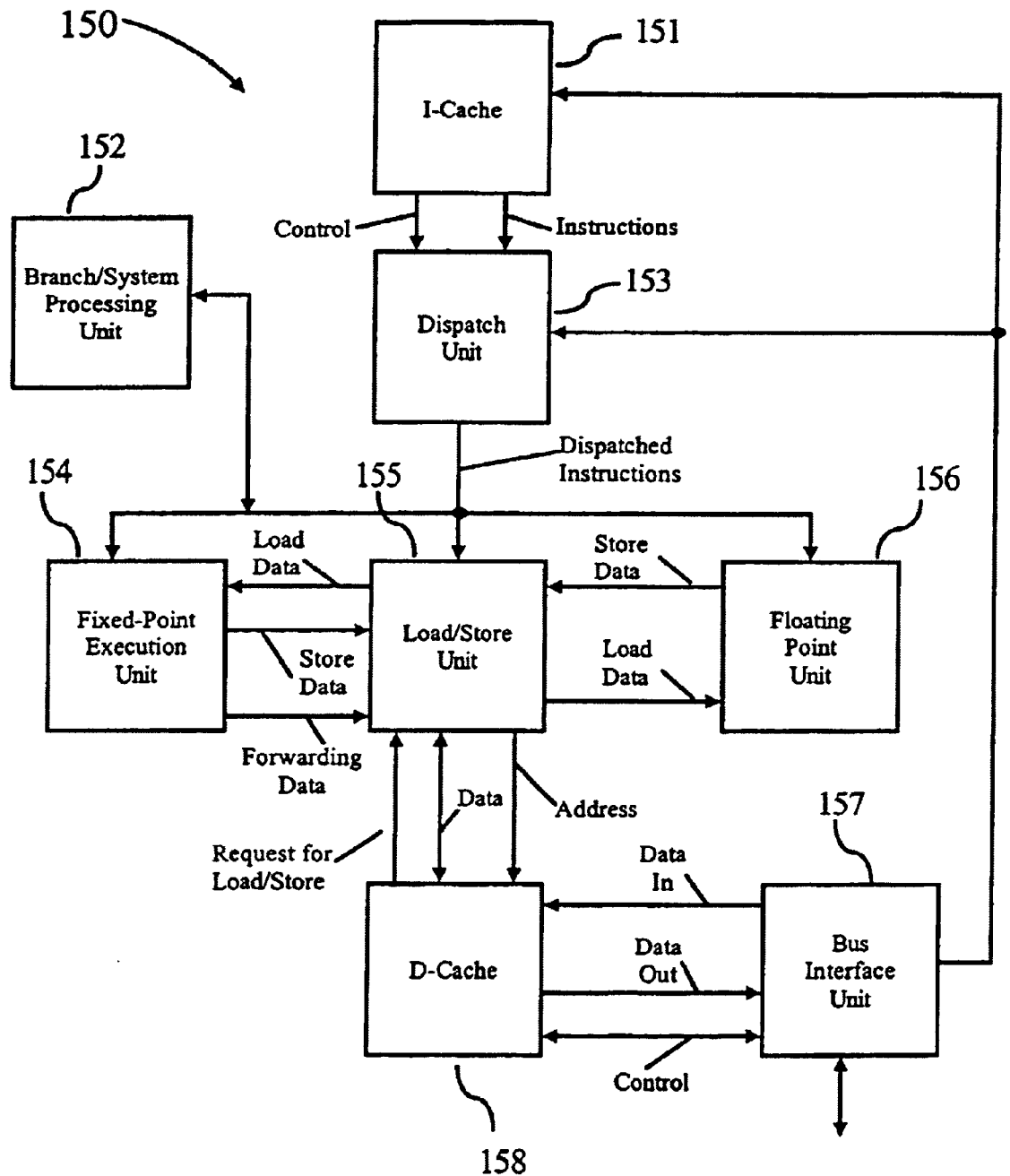
FIG. 1B is a high level functional block diagram of selected operational blocks within a CPU.

FIG. 1B is a high level functional unit 150 illustrating selected operational blocks within CPU 110. In the illustrated embodiment, CPU 110 includes an internal instruction cache (I-cache) 151 and data cache (D-cache) 158 which are accessible through bus 112 (FIG. 1A) and bus interface unit 157 and load/store unit 155. In the depicted architecture, CPU 110 operates on data in response to instructions retrieved from I-cache 151 through instruction dispatch unit 153. In response to dispatch instructions, data retrieved from D-cache 158 by load/store unit 155 can be operated upon using either fixed point execution unit 154 or floating point execution unit 156. Instruction branching is controlled by branch/system processing unit 152.

Figure 2A:
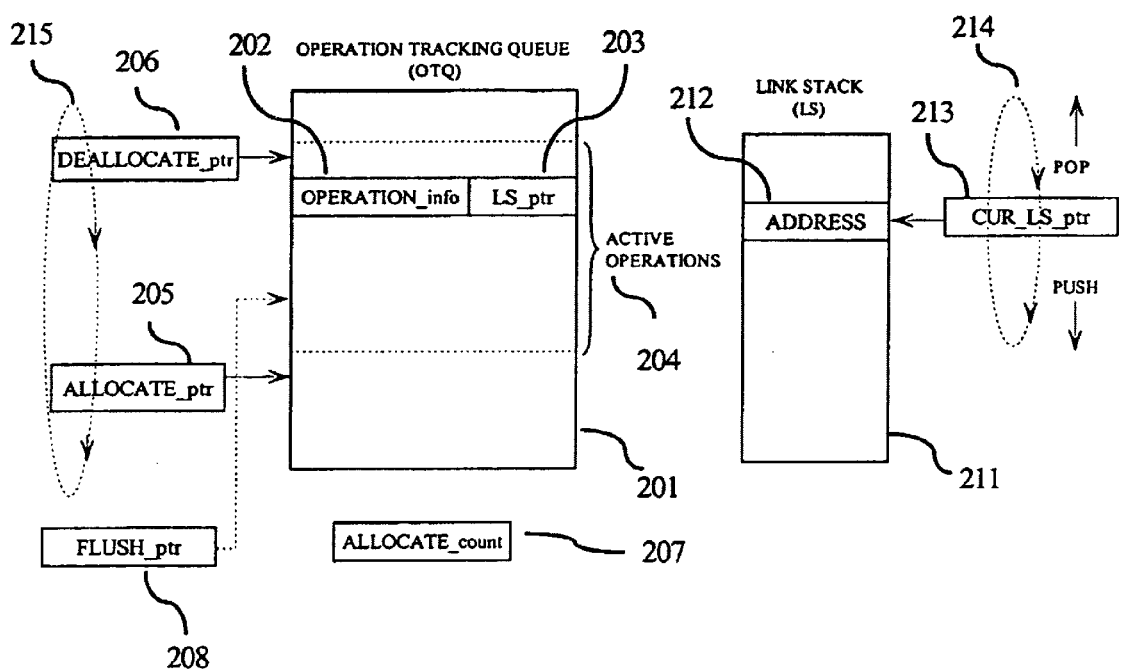
FIG. 2A illustrates operation tracking queue and link stack mechanisms.

FIG. 2A illustrates features and functions of an operation tracking queue (OTQ) 201 and a link stack (LS) 211. LS 211 stores addresses 212 and current link stack pointer (CUR_LS_ptr) 213 points to a particular register in the stack storing address 212. The OTQ 201 is a register stack that contains operations that are being tracked during instruction execution. Each entry in OTQ 201 has two register fields, OPERATION_info field 202 (description of the operation) and LS_ptr field 203 (contains a link stack pointer associated with the corresponding operation). If the instructions being tracked only include "branch and link" (BrL) and "branch to link register" (BrLR) instructions, then the operations would include PUSH (add addresses to LS 211) and a POP (extract an address from LS 211). A BrL instruction is used in a subroutine call where the processor branches to instructions in the subroutine and the return address is next instruction after the subroutine call. The return address is stored in or "pushed onto" a link stack (e.g., LS 211). When the processor gets to the end of the subroutine, a BrLR instruction branches back to the previously stored return address in the link stack (e.g., LS 211). In this case, the return address is retrieved from or "popped from" the link stack (e.g., LS 211).

In general, however, the OTQ 201 may be a queue that is tracking all instructions or some other subset of instructions pending in a processor's execution stream. POP and PUSH operations on LS 211 use a "last in first out" (LIFO) protocol. PUSH operations move addresses down LS 211 and POP operations extract addresses off the top of LS 211 (again LIFO defines the top of the link stack). Loop 214 indicates that sequential PUSH operations, which exceed the size of LS 211, will cause the CUR_LS_ptr to "wrap" around LS 211. Operations that are added to OTQ 201 are "allocated" and an allocate pointer (ALLOCATE_ptr) 205 indicates where the next operation will be added. Operations are "deallocated" (removed) whenever a pending instruction, associated with an address 212, has been committed (will be executed in the non speculative instruction path). Deallocate pointer (DEALLOCATE_ptr) 206 indicates which operation will be deallocated. If a sequence of pending instructions, possibly associated with a sequence of addresses 212 (thus operations utilizing these addresses), are not going to be executed (determined by the processor or CPU), then these operations are removed with a "flush". Flush pointer (FLUSH_ptr) 208 points to the beginning of the sequence of operations to be removed. An allocate counter (ALLOCATE_count) 207 keeps track of the number of pending operations in OTQ 201. At any one time there exists a group of operations in the OTQ 201 that are active and these are indicated by ACTIVE OPERATIONS 204 from ALLOCATE_ptr 205 to and including DEALLOCATE_ptr 206. Loop 215 indicates that ALLOCATE_ptr 205 and DEALLOCATE_ptr 206 wrap around OTQ 201.

Figure 2B:
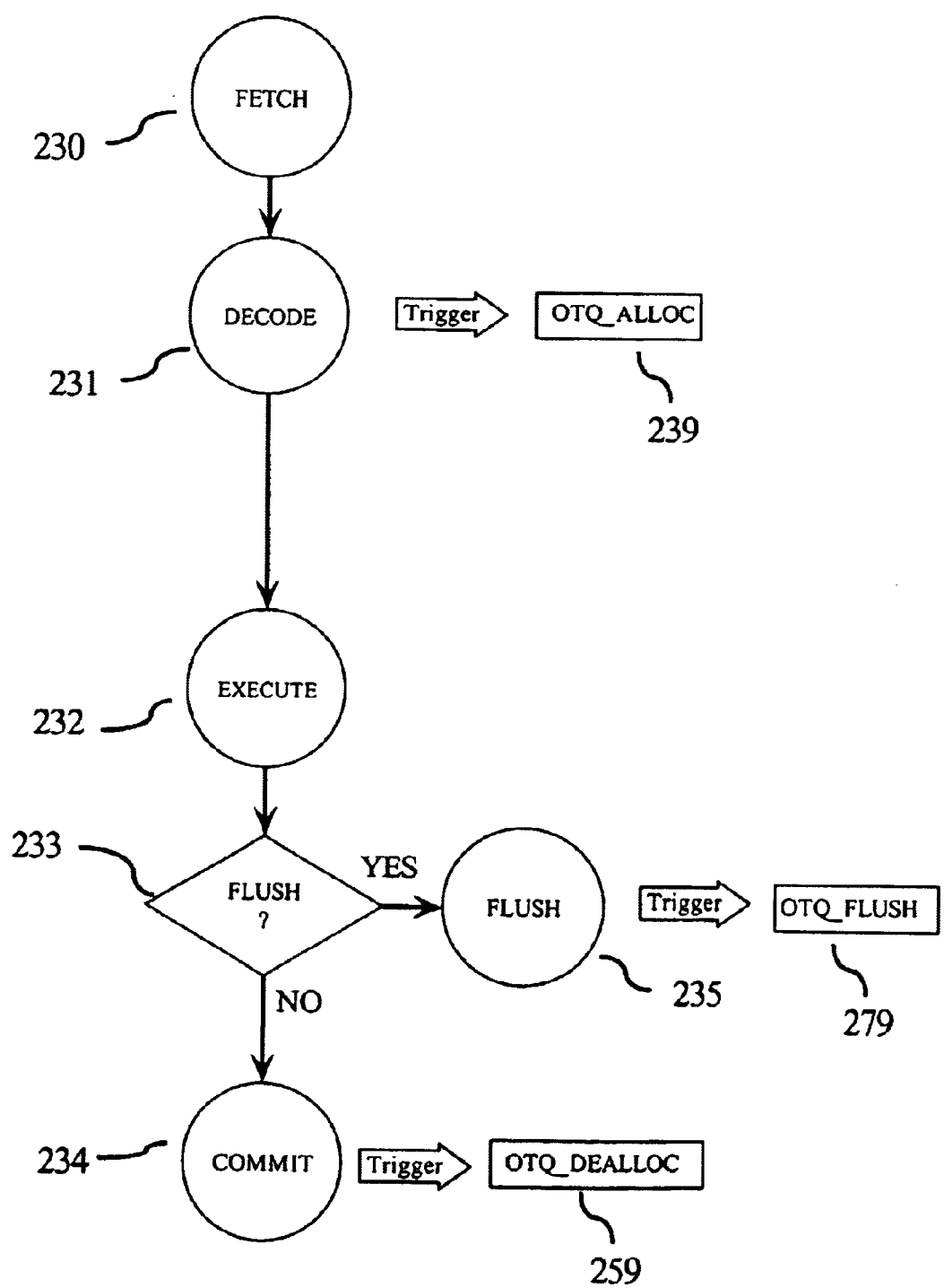
FIG. 2B illustrates phases of the life cycle of operations used in embodiments of the present invention.

FIG. 2B is a flow diagram of processor operations that may occur when an OTQ 201 and an LS 211 are used to track operations. When a processor is doing speculative instructive execution (using algorithms to predict and execute future instructions) outside of the "committed" or actual instruction execution stream, then the instructions may trigger operations that are tracked in an OTQ 201 and LS 211. In step 230, an instruction is fetched from an instruction cache (e.g I_CACHE 151). The instruction is decoded in step 231. Decoding an instruction leads to a determination whether the instruction should also trigger operations that will be tracked in a queue(e.g., exemplary OTQ 201). If an instruction triggers an operation that is to be tracked, then an OTQ_ALLOC 239 (described in conjunction with the flow diagram in FIG. 2C) would be used to allocate or add the operation to OTQ 201. Since the processor may have many instructions in its pipeline, there may be many computer cycles between a decode in step 231 and an actual instruction execution in step 232. An execution in step 232 would generate results that would be compared to results from a corresponding speculative execution. This compare may determine that a speculative (look ahead) path has been actually taken in the committed instruction execution stream. If the results of the instruction execution of step 232 determine that a sequence of speculative instructions (operations tracked in OTQ 201) will not be executed in the committed instruction execution stream, then the OTQ 201 operations are flushed or removed. A FLUSH in step 235 triggers an OTQ_FLUSH 279 (described in conjunction with the flow diagram in FIG. 2E) which flushes operations of OTQ 201. If the execution in step 232 generates results that indicate that the speculative instructions will be executed, then a commit in step 234 executes an OTQ_DEALLOC 259 (described in conjunction with the flow diagram in FIG. 2D) which will remove the OTQ 201 operation (pointed to by DEALLOCATE_ptr 206) and possibly an associated address 216 in the LS 211. It should be noted that the operations in the OTQ 201 and the LS 211 are not removed in the sense of erased, instead removed operations are free to be written over by subsequent OTQ 201 operations.

Figure 2C:
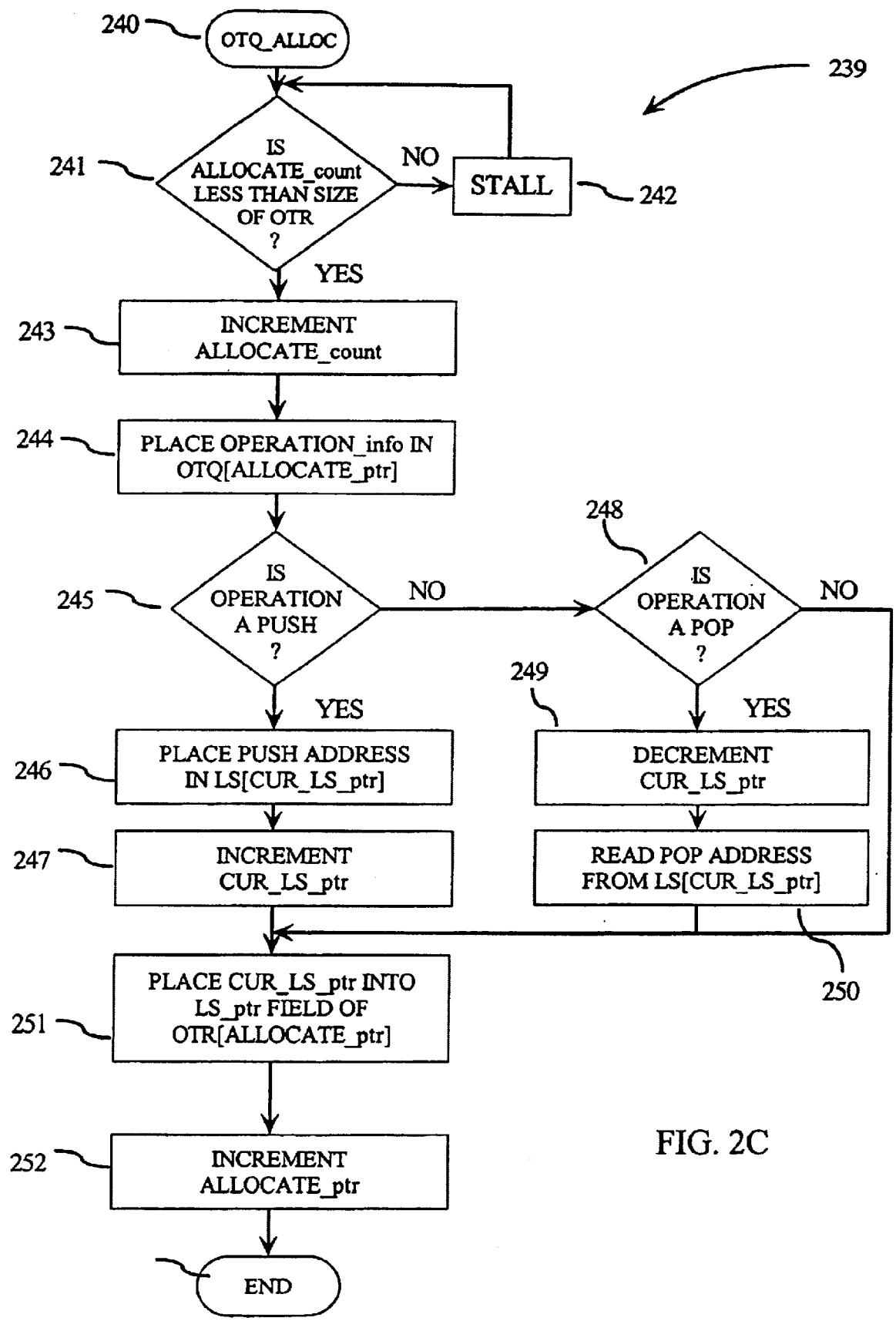
FIG. 2C illustrates an operation tracking queue and a link stack.

FIG. 2C is a flow diagram for algorithms for the OTQ_ALLOC 239 operation to OTQ 201 used in FIG. 2A. In step 240, the OTQ_ALLOC 239 is called. Step 241 tests if ALLOCATE_count 207 has a count less than the size of the register stack in OTQ 201. This test determines whether OTQ 201 is full. If the result of the test in step 241 is NO, then a wait via a STALL is executed in step 242. As soon as OTQ 201 is able to accept an operation, the ALLOCATE_count 207 is incremented in step 243. In step 244, the information defining the operation (POP, PUSH or OTHER) is placed in the OPERATION_info 202 field of the register position pointed to by the ALLOCATE_ptr 205. Step 245 tests whether the operation is a PUSH. If the result of the test in step 245 is a YES, then in step 246 the PUSH address (the address of the instruction following the PUSH is associated with the OPERATION_info 202) is placed the LS 211 register pointed to by the CUR_LS_ptr 213. In step 247, the CUR_LS_ptr 213 is incremented one position. In step 251, the value of CUR_LS_ptr 213 is placed into the LS_ptr field 203 of the register in OTQ 201 pointed to by ALLOCATE_ptr 205. In step 252, the ALLOCATE_ptr 205 is incremented (moved down one position). Step 253 executes an END of OTQ_ALLOC 239. If the result of the test in step 245 is NO, then the operation is not a PUSH, then a test is done in step 248 to determine if the operation is a POP. If the result of the test in step 248 is YES, then the operation in step 248 is a POP. In step 249, CUR_LS_ptr 213 is decremented. In step 250, the POP address (placed in the LS 213 in a previous PUSH) is read from the register in LS 211 pointed to by CUR_LS_ptr 213. Following step 250, steps 251, 252, and 253 are executed as in the PUSH operation after a YES in step 245. If the result of the test in step 248 is NO, then the operation is not a POP (an OTHER operation), then a branch to step 251 is executed followed by steps 252 and 253 as in the PUSH and POP operations.

Figures 2D, 2E:
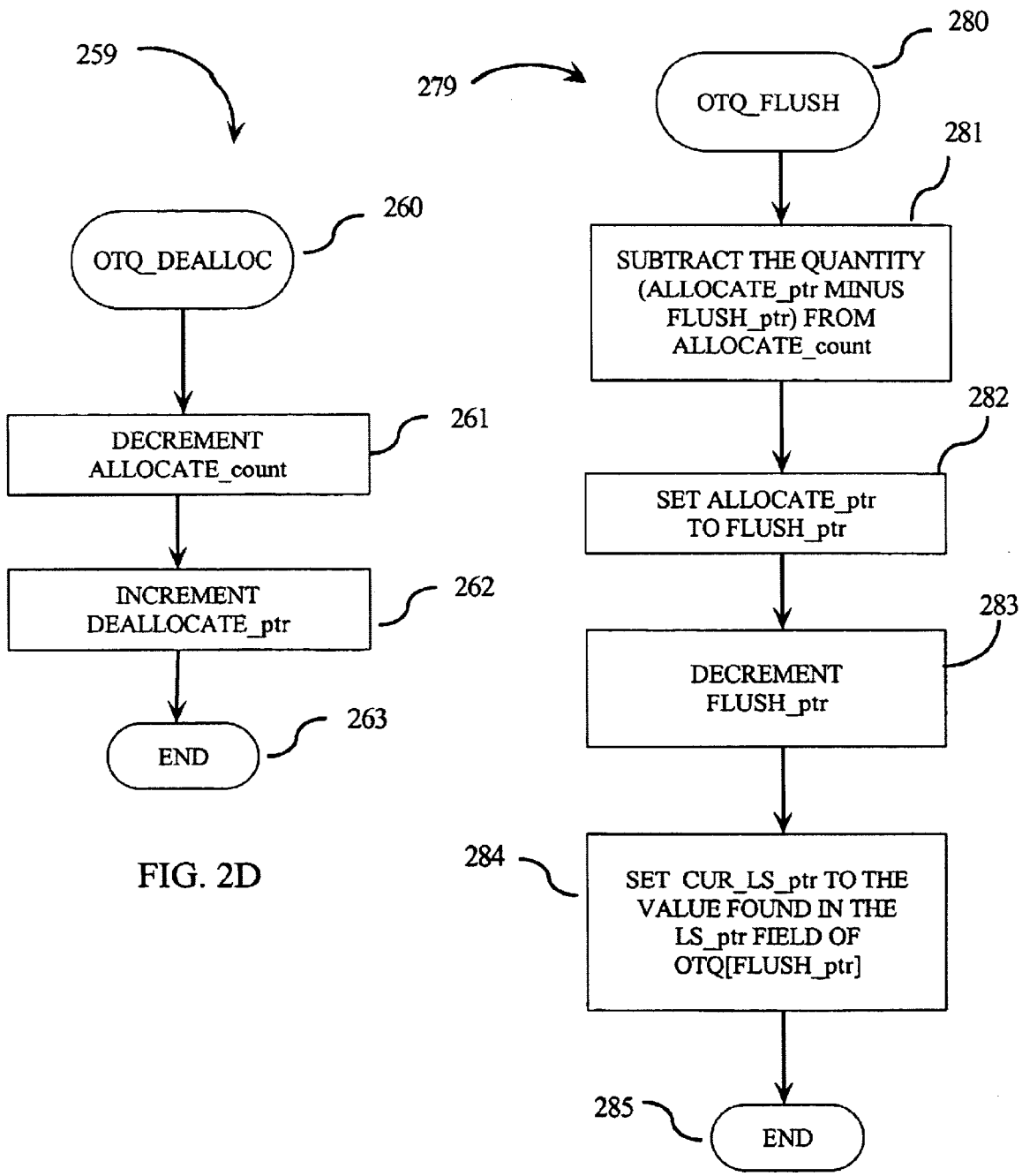
FIG. 2D illustrates another operation tracking queue and a link stack.
FIG. 2E illustrates an example of operation states in an operation tracking queue and a link stack.

FIG. 2D is the flow diagram for algorithms of the OTQ_DEALLOC 259 and the OTQ_FLUSH 279 used in OTQ 201 in FIG. 2A. In step 260, the OTQ_DEALLOC 259 is called and in step 261 ALLOCATE_count 207 is decremented. In step 262, DEALLOCATE_ptr 206 is incremented by one. Incrementing DEALLOCATE_ptr 206 frees the register it was pointing to so it can be used for a future OTQ_ALLOC 239 In this sense the operation is removed from OTQ 201. After step 262 an END is executed in step 263 to complete OTQ_DEALLOC 259.

FIG. 2E is a flow diagram for an OTQ_FLUSH 228. In step 280, an OTQ_FLUSH 279 is called. In step 281, the quantity ALLOCATE_ptr 205 minus FLUSH_ptr 208 is calculated. This quantity is then subtracted from the count in ALLOCATE_count 207. ALLOCATE_count 207 now indicates how many register positions are open in OTQ 201. In step 282, the value of ALLOCATE_ptr 205 is set to FLUSH_ptr 208. This operation frees the register positions in OTQ 210 previously held by the flushed operations for subsequent allocated operations. In step 283, FLUSH_ptr 208 is decremented moving it up, or opposite the direction ALLOCATE_ptr 205 moves, as new operations are allocated. In step 284, CUR_LS_ptr 213 is set to the value in the LS_ptr field 203 of the register pointed to by FLUSH_ptr 208. An END is executed in step 285 to complete OTQ_FLUSH 227.

Figure 2F:
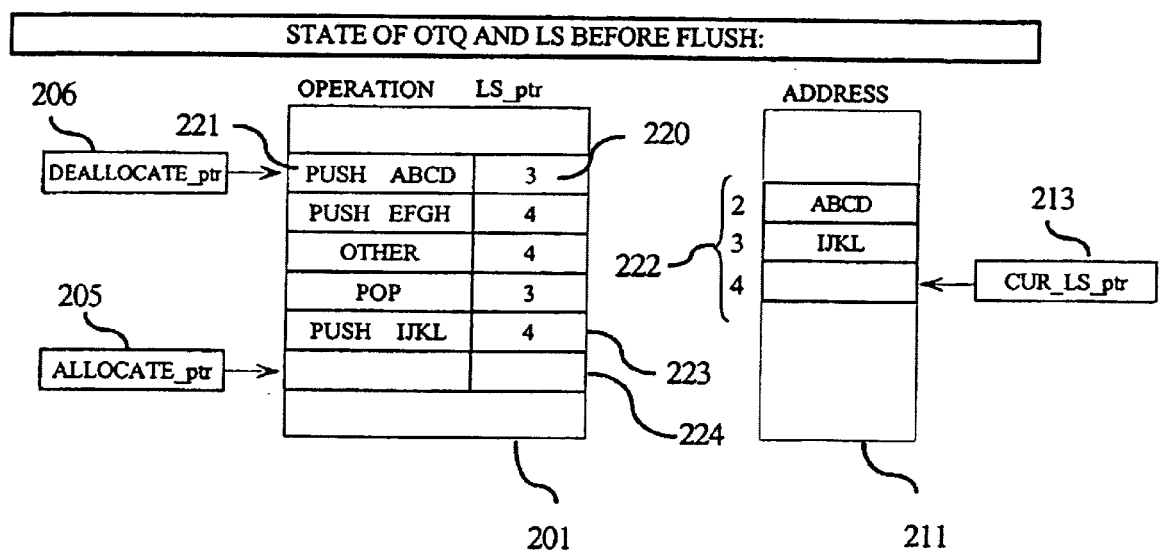
FIG. 2F illustrates another example of operation states in an operation tracking queue and a link stack.
Figure 2G:
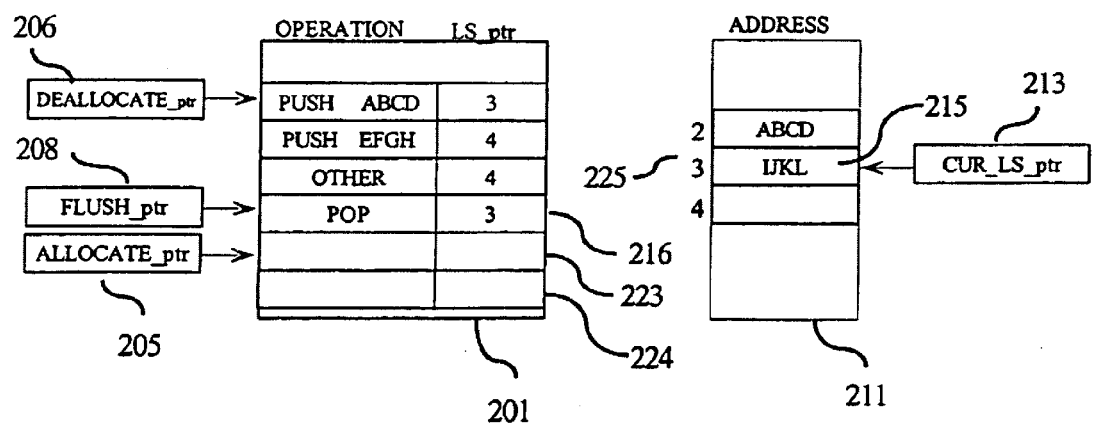
FIG. 2G illustrates another example of operation states in an operation tracking queue and a link stack.
Figure 2H:
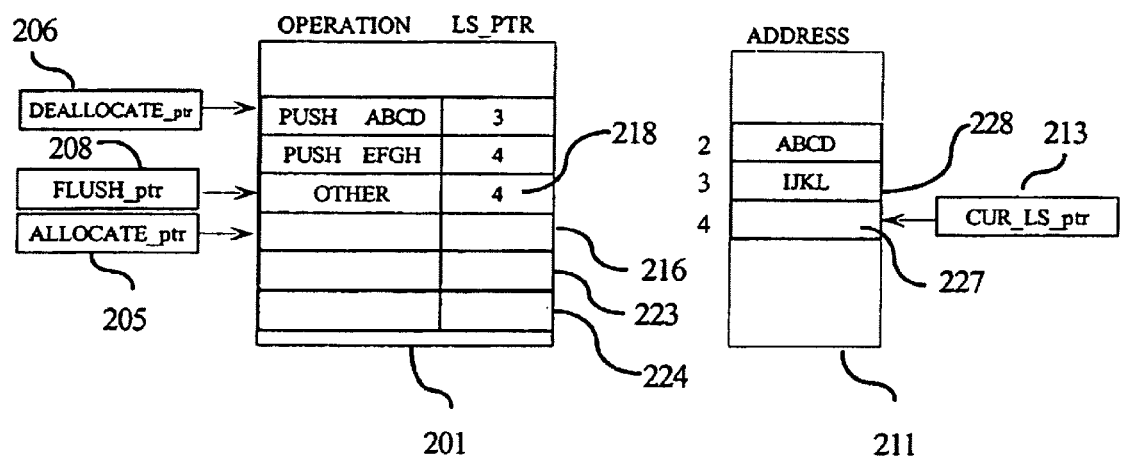
FIG. 2H illustrates another example of operation states in an operation tracking queue and a link stack with two entries flushed.

FIGS. 2F–2H illustrate the states of register fields in the OTQ 201 and LS 211 for various stages in a flush cycle of an OTQ_FLUSH 279. FIG. 2F illustrates the states of register fields of OTQ 210 before an OTQ_FLUSH 279. OTQ 201 contains active operations between ALLOCATE_ptr 205 and DEALLOCATE_ptr 206. These active operations were placed in OTQ 201 using a sequence of OTQ_ALLOC 239 operations; no OTQ_DEALLOC 259 has yet occurred in this example. DEALLOCATE_ptr 206 is pointing to a register whose operation field 221 contains PUSH ABCD and whose link stack field 220 contains a value "3". ALLOCATE_ptr 205 points to a blank register 224 in OTQ 201(in general registers have contents but a blank register illustrates one that may be written into). CUR_LS_ptr 213 also points to a blank register in LS 211. Following the flow diagrams of the algorithms for OTQ_ALLOC 239 (PUSH, POP and OTHER) in FIGS. 2C–2D shows how the fields of OTQ 201 and LS 211 arrived at the values indicated in FIG. 2E. LS 211 register addresses 222 are shown as 2–4, other addresses (e.g., 1 and 5-N) are not shown for simplicity but are implied where N is the size of LS 211. The operations in registers from DEALLOCATE_ptr 206 to, but not including, ALLOCATE_ptr 205 (active operations of OTQ 201 in FIG. 2E) had to occur as the result of a subroutine call using a BrL (branch and link) instruction (pushes address ABCD onto LS 211). This is followed by a first nested subroutine call using another BrL (pushes address EFGH onto LS 211). This is followed by another non-push, non-pop operation. This is followed by a BrLR instruction expected to return from the first nested sub-routine. This is followed by a second nested sub-routine call using another BrL (pushes IJLK onto LS 211 in same position previously occupied by EFGH. In the present example, other logic (not shown) may determine that one or more of the most recent active operations will not be committed and that they should be flushed.

FIG. 2G illustrates register states of OTQ 201 and LS 211 in the case where one entry (PUSH IJKL) has been flushed. Register 223 contains the operation that is to be flushed (by definition for this example); this determination was made by other processor logic (not shown). ALLOCATE_ptr 205 points to a blank register 223. Since only one operation is to be flushed, execution of OTQ_FLUSH 279 places FLUSH_ptr 208 to the desired point in OTQ 201 (register 223). The number of operations to be flushed is calculated as in step 281 of FIG. 2D, then ALLOCATE_ptr 205 is set to the value of FLUSH_ptr 208 (points to register 223) and then the FLUSH_ptr 208 is decremented to point to register 216. ALLOCATE_ptr 205 is now pointing to the next register position in which a new operation will be allocated (register 223). Register 223 contains the operation that has been flushed (a new allocated operation will write over the information in register 223). Step 284 of OTQ_FLUSH 279 in FIG. 2E sets CUR_LS_ptr 213 to the value found in the LS_ptr field 203 of the register pointed to by FLUSH_ptr 208 (register 216 with LS_ptr field value of 3) once it has been decremented. LS 211 register 225 (indicated by 3) contains an address 215 (IJKL). The method in FIGS. 2C–2D avoids the flushed address IJKL by decrementing CUR_LS_ptr 213 before a POP address is read from the link stack LS 211.

FIG. 2H illustrates the case where two OTQ 201 entries are flushed. The OTQ_FLUSH 279 of FIG. 2D will again be executed. In this example, the FLUSH_ptr 208 would first be set to point to register 216 by processor logic (not shown) and ALLOCATE_ptr 205 would point to register 224 (see FIG. 2E). The difference between FLUSH_ptr 208 and ALLOCATE_ptr 205 would be calculated and ALLOCATE_count 207 (see FIG. 2A) decremented (two counts for this example). ALLOCATE_205 would then be set to the value of FLUSH_ptr 208 (points to register 216) and then FLUSH_ptr 208 would be decremented one position to register 218. Since the LS_ptr field 203 of register 218 contains a value of "4", then this value is set into CUR_LS_ptr 213 which then points to LS 211 register 227 ( register address is "4"). A new OTQ_ALLOCATE 239 would place the next operation into register 216 and the address from the OPERATION_info field 202 into register 227 (pointed to by CUR_LS_ptr 213). For this two-entry flush example, a subsequent POP operation would decrement CUR_LS_ptr 213 to register 228 which contains a corrupted LS 211 address UKL (address associated with flushed PUSH IJKL). The two entry flush, using the OTQ 201 and link stack 211 in FIG. 2A and the algorithms of FIGS. 2C–2D, does not correct the corrupted address in register 228 of LS 211. The flow diagram shown in FIGS. 2C–2D and explained in the examples in FIGS. 2F–2H corrects some link stack corruptions, however as the example in FIG. 2H indicates some corruption may still occur which is not corrected and machine performance may suffer in these instances.

Figure 3A:
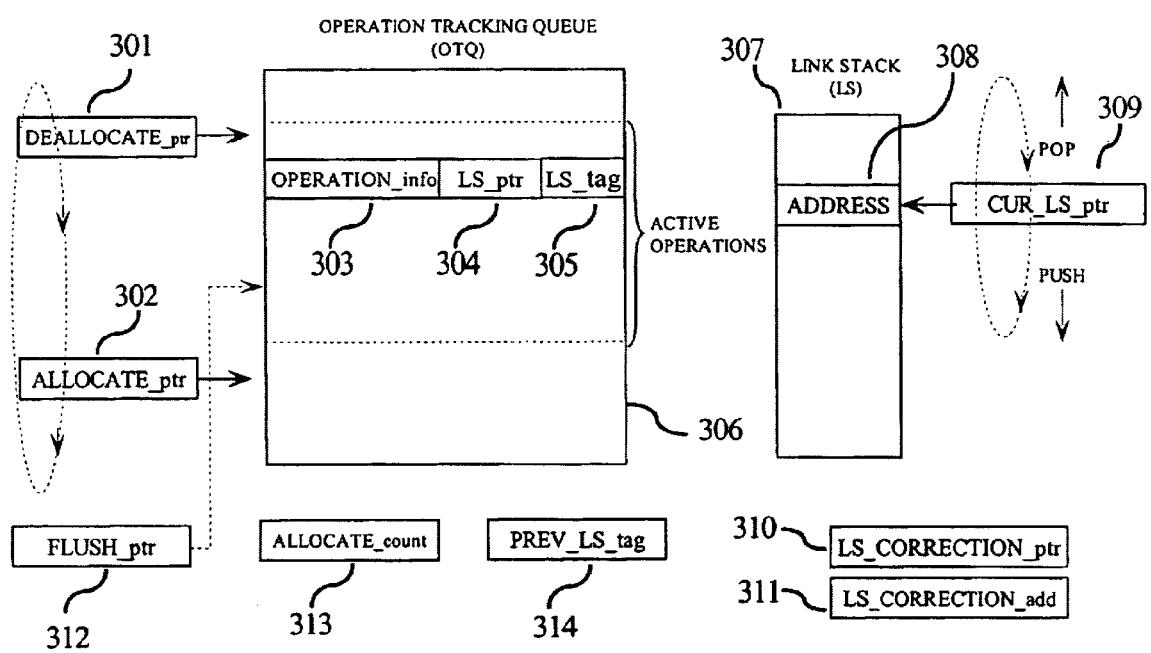
FIG. 3A illustrates operation tracking queue and link stack mechanisms in an embodiment of the present invention.

FIG. 3A illustrates an OTQ 306, LS 307 and additional registers 314, 310 and 311 used in another embodiment of the present invention. OTQ 306 has a field, LS_tag 305, in addition to the register fields in OTQ 201 illustrated in FIG. 2A. OTQ_306 also contains register field OPERATION_info field 303 and LS_ptr field 304 as did OTQ 201 illustrated in FIG. 2A. LS 307 has addresses 308 and CUR_LS_ptr 309. OTQ 306 has DEALLOCATE_ptr 301, ALLOCATE_ptr 302, ALLOCATE_count 313, and FLUSH_ptr 312 which have functions as explained for OTQ 201 above. OTQ 306 has an additional register, PREV_LS_tag 314, which stores a particular tag from the LS_tag field 305. In this example, the LS_tag field 305 value is the middle portion of the PUSH address (e.g., for address ABCD LS_tag would be BC). LS 307 has addition registers for storing link stack correction pointers (LS_CORRECTION_ptr 310) and link stack correction addresses (LS_CORRECTION_addr 311). LS 307 includes LS addresses 308 and CUR_LS_ptr 309.

Figure 3B:
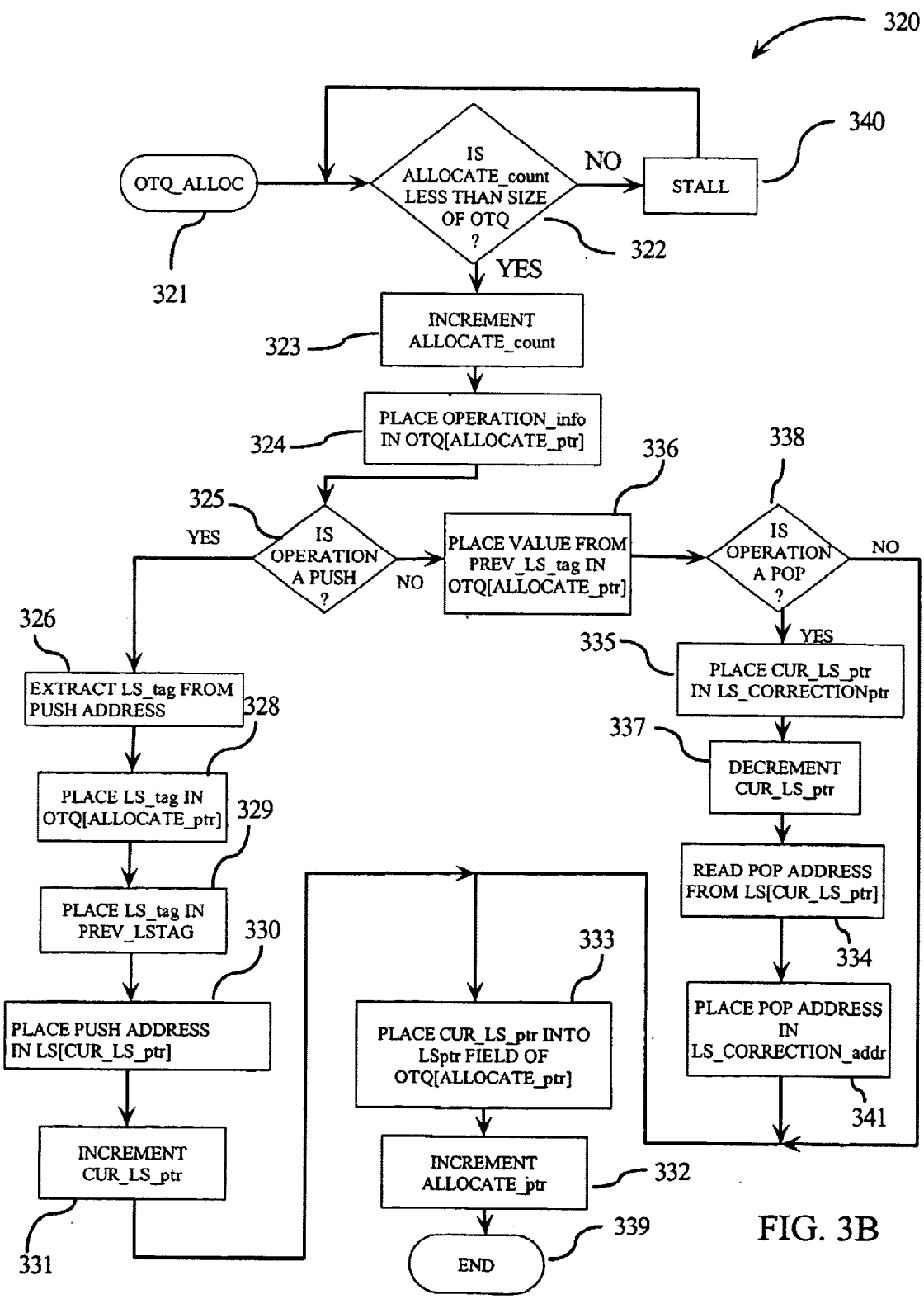
FIG. 3B illustrates an example of operation tracking queue and link stack operation algorithms used in embodiments of the present invention.
Figure 3C:
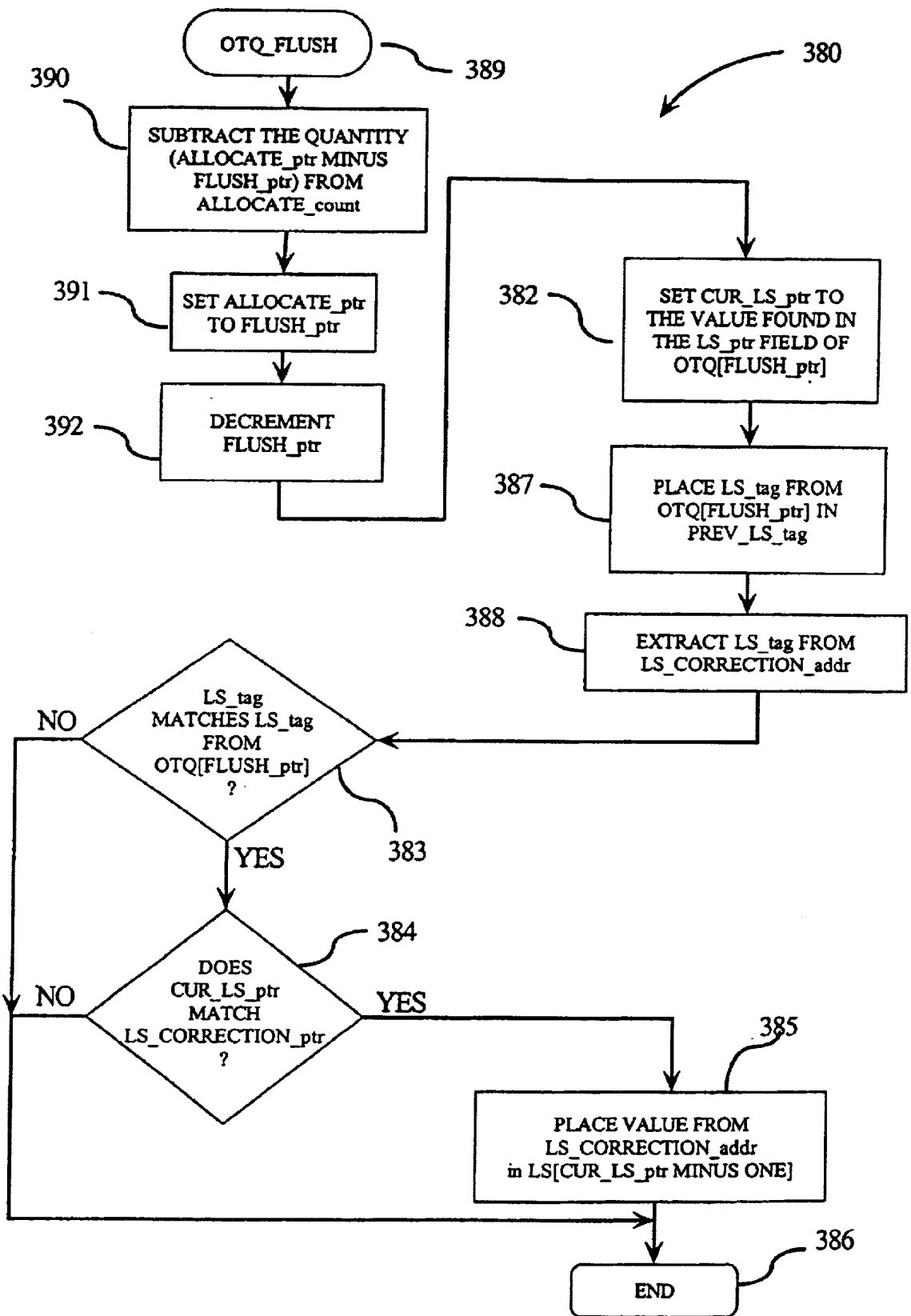
FIG. 3C illustrates an example of operation tracking queue and link stack operation algorithms used in embodiments of the present invention.

FIGS. 3B and 3C are flow diagrams illustrating OTQ_ALLOC process 320 and OTQ_FLUSH process 380, respectively, for the embodiment illustrated in FIG. 3A. Referring first to FIG. 3B, in step 321, the OTQ_ALLOC 320 is called. Step 322 tests if ALLOCATE_count 313 has a count less than the size of OTQ 306. This test determines whether OTQ 306 is full. If the result of the test in step 322 is NO, then a wait via a STALL is executed in step 340. As soon as OTQ 306 is able to accept an operation, the ALLOCATE_count 313 is incremented in step 323. In step 324, the information defining the operation (POP, PUSH or OTHER) is placed in the OPERATION_info 303 field of the register pointed to by the ALLOCATE_ptr 302. Step 325 tests if the operation is a PUSH. If the test result is YES, a branch to step 326 is executed where a link stack tag(LS_tag) is extracted from the PUSH address (middle portion the PUSH address of the PUSH operation). This is a portion of the PUSH address that is adequate to generate an LS_tag 305 that is likely to be unique for the OTQ 306. In step 328, the extracted link stack tag is placed, as LS_tag 305, in the link stack tag field of the register in OTQ 306 pointed to by ALLOCATE_ptr 302. In step 329, the value in LS_tag field 304 is also placed in PREV_LS_tag register 314. In step 330, the PUSH address from the PUSH operation is placed in the LS 307 register pointed to by CUR_LS_ptr 309. In step 331, CUR_LS_ptr 309 is incremented by one. In step 333, the CUR_LS_ptr 309 is then place in the LS_ptr field 304 in OTQ 306. In step 332, ALLOCATE_ptr 302 is incremented by one and an END is executed in step 339 completing OTQ_ALLOC 320. If the result of the test in step 325 is NO, then in step 336 the value from PREV_LS_tag 314 is placed in the OTQ 306 register pointed to by ALLOCATE_ptr 302. In step 338, a test to determine if the OTQ 306 POP operation is executed. If the result of the test is YES, then in step 335 the CUR_LS_ptr 309 is placed in the LS_CORRECTION ptr register 310. In step 337, CUR_LS_ptr 309 is decremented by one. In step 334, the POP address is read from the LS 307 register pointed to by CUR_LS_ptr 309. In step 341, the POP address read in step 334 is placed in LS_CORRECTION_addr register 311. Next steps 333, 332 and 339 are executed as in the PUSH operation above completing OTQ_ALLOC 320. If the result of the test in step 338 is NO then a branch to step 333 is executed and steps 333, 332 and 339 are executed as in the POP operation above completing OTQ_ALLOC 320.

Referring now to FIG. 3C, in step 390, an OTQ_FLUSH 380 is called. In step 390, the quantity, ALLOCATE_ptr 302 minus FLUSH_ptr 312, is calculated (a FLUSH removes all the operations from the FLUSH_ptr 312 to ALLOCATE_ptr 302). This quantity is then subtracted from the count in ALLOCATE_count 313. ALLOCATE_count 313 now indicates how many registers are open in OTQ 306. In step 391, ALLOCATE_ptr 302 is set to FLUSH_ptr 312. This operation frees the registers in OTQ 306 previously used by the flushed operations for subsequent PUSH operations. In step 392, FLUSH_ptr 312 is decremented moving FLUSH_ptr 312 opposite the direction ALLOCATE_ptr 302 moves as new operations are allocated to OTQ 306. In step 387, the value from LS_tag field 304 of the register in OTQ 306 pointed to by FLUSH_ptr 312 is placed in register PREV_LS_tag 314. In step 388, an LS_tag is extracted from the link stack correction address (LS_CORRECTION_addr) from the LS_CORRECTION_addr 311 register. A test is executed in step 383 to determine if the LS_tag, extracted from LS_CORRECTION_addr 311, matches the value from LS_tag field 305 in the OTQ 306 register pointed to by FLUSH_ptr 312. If they do not match in step 383, then an END is executed in step 386 completing OTQ_FLUSH 380. If there is a match in step 383, then a test is made in step 384 to determine whether CUR_LS_ptr 309 matches the LS_ptr in LS_CORRECTION_ptr register 310. If there is no match in step 384, then an END is executed in step 386 completing OTQ_FLUSH 380. If there is a match in step 384, then the value in LS_CORRECTION_addr register 310 is placed in the LS 307 register pointed to by CUR_LS_ptr 309 when decremented by one. Then an END is executed in step 386 completing OTQ_FLUSH 380.

Figure 3D:
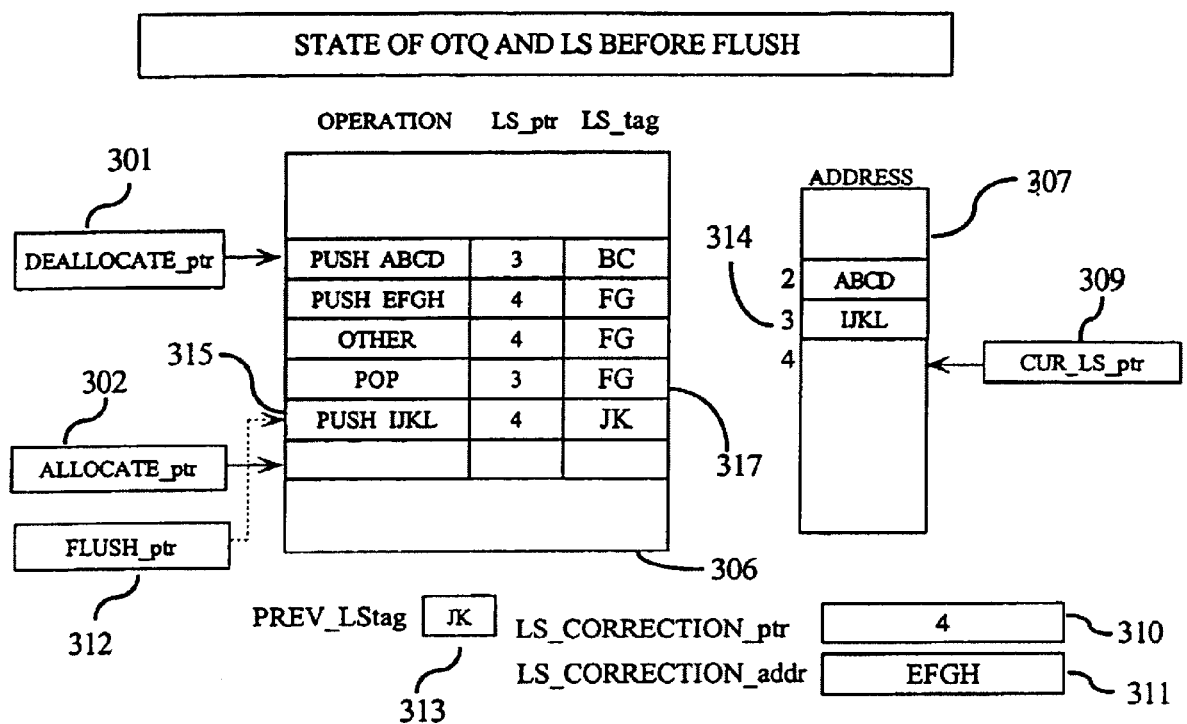
FIG. 3D illustrates an example of operation tracking queue and link stack operation in embodiments of the present invention.
Figure 3E:
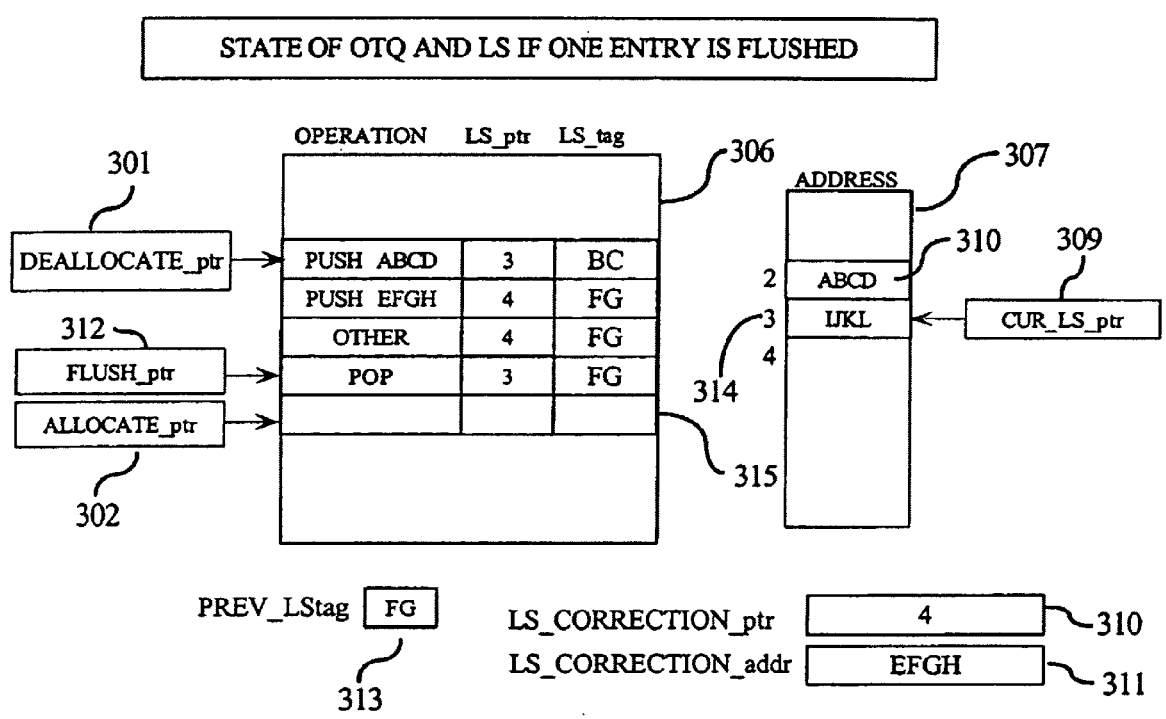
FIG. 3E illustrates another example of operation tracking queue and link stack operation in embodiments of the present invention.
Figure 3F:
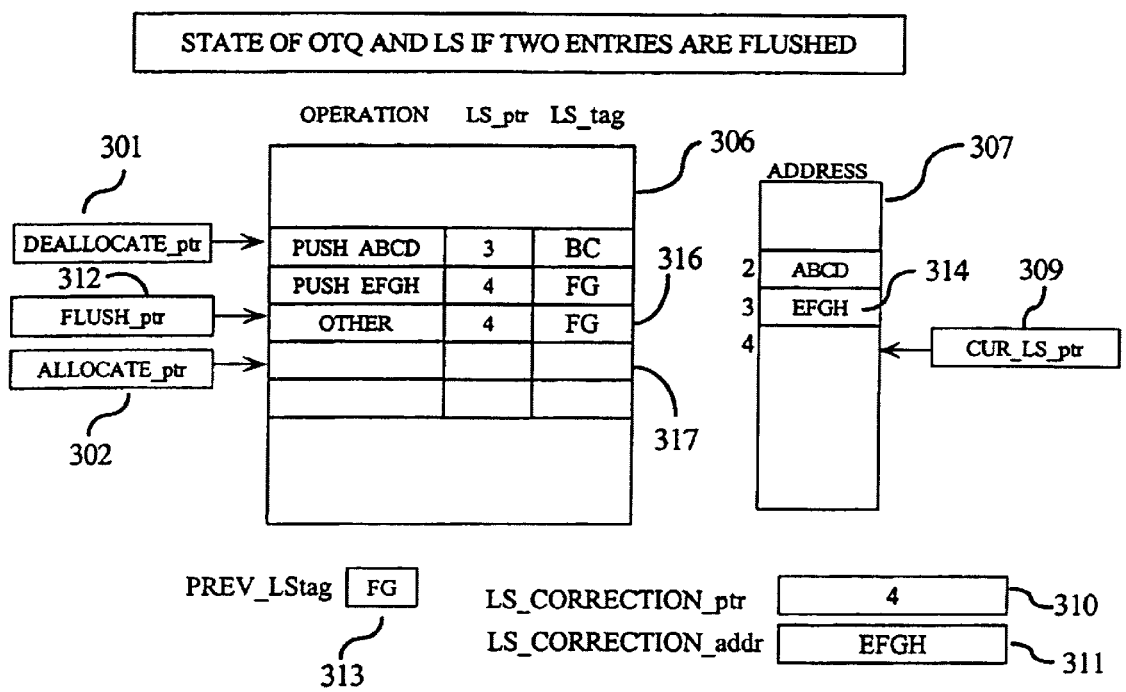
FIG. 3F illustrates another example of operation tracking queue and link stack operation in embodiments of the present invention.

FIGS. 3D–3F illustrate states of register fields in OTQ 306 and LS 307 and various other registers in the embodiment of FIG. 3A. FIG. 3D illustrates the states of registers after five operations, PUSH ABCD, PUSH EFGH, OTHER, POP, AND PUSH IJKL have been allocated to OTQ 306. OTQ_FLUSH process in FIG. 3B may be used insetting the register states in FIG. 3D. The states in FIG. 3D may represent the states prior to a single entry FLUSH operation. The subsequent FLUSH may use OTQ_FLUSH process 380 in FIG. 3C. FLUSH_ptr 312 is first set to the operation to be flushed by processor logic (not shown). In FIG. 3E only one operation is to be flushed, so FLUSH_ptr 312 is set to register 315 (PUSH IJKL operation). The value in LS_tag field 305 (two middle portions "JK" of push address "IJKL") is placed in PREV_LS_tag register 313. The corresponding LS_tag is extracted from LS_CORRECTION_addr register 311 (again in this example the middle two portions from EFGH). The LS_tag 309 from the operation to be flushed and the LS_tag extracted from LS_CORRECTION_addr register 311 do not match, therefore no action is taken and the OTQ_FLUSH 381 is ended. CUR_LS_ptr 309 points to register 314 with a corrupted entry. A subsequent POP would decrement CUR_LS_ptr 309 to point to register 310 before the address is read, therefore the corrupted entry in register 314 would be avoided and the correct POP address ABCD would be read. If the next operation is a PUSH, then the corrupted entry in register 314 would be overwritten.

FIG. 3F illustrates register states of FIG. 3D when two entries are flushed. When two entries are flushed, FLUSH_ptr 312 is set, by processor logic (not shown), to point to register 317 (POP operation). Following method steps 390–392 of OTQ_FLUSH process 380 in FIG. 3C, the ALLOCATE_ptr 302 will point to register 317 and FLUSH_ptr 312 is decremented to point to register 316 with LS_tag 318 (contains value FG). Method steps 382, 387, and 388 (FIG. 3C) set up the comparisons in steps 383 and 384 (FIG. 3C). Since both the comparisons match, step 385 is executed and the address in LS_CORRECTION_addr register 311 is placed in the register pointed to by the decremented (by one) CUR_LS_ptr 309. This corrects LS 307 entry 316 to EFGH. The corrupted LS 307 address entry 316 (IJKL), set by of flushed PUSH IJKL, is replaced by EFGH (the next PUSH address that a POP operation should read). CUR_LS_ptr 309 is pointing to the correct register if a PUSH operation is next executed. This embodiment corrects both the corrupted LS 307 entry and CUR_LS_ptr 309.

Figure 4A:
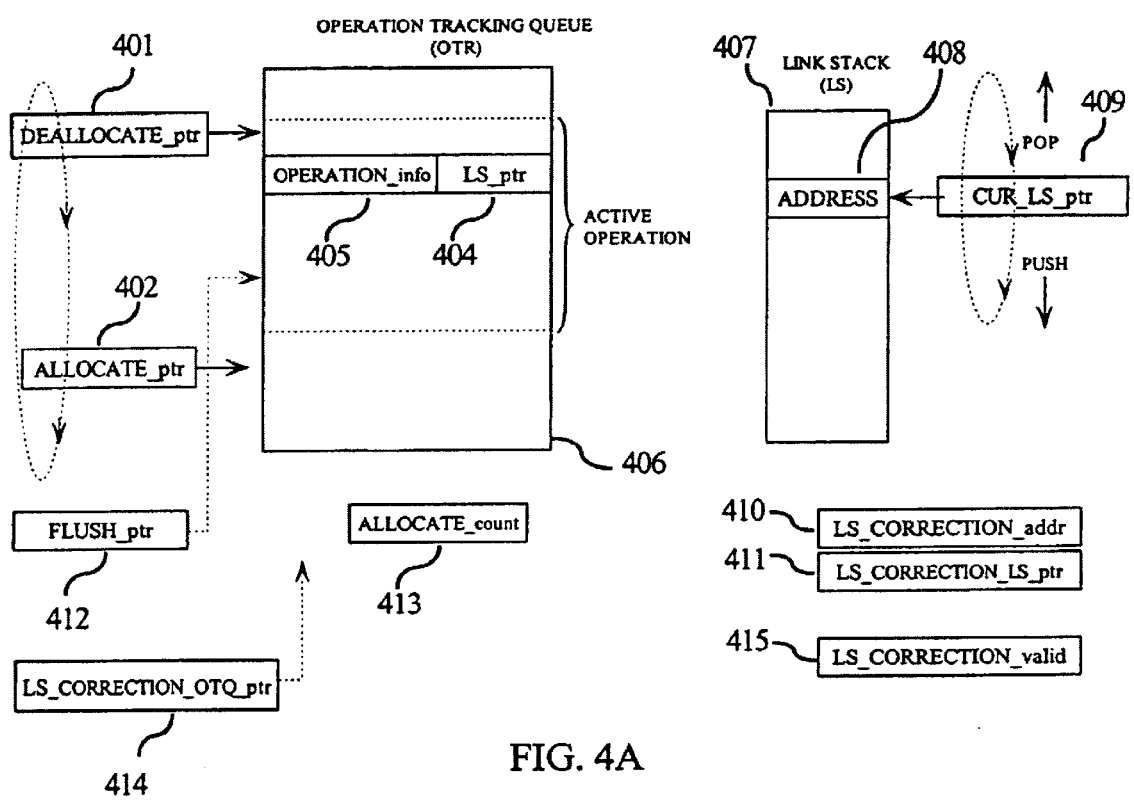
FIG. 4A illustrates an operation tracking queue and link stack used in alternate embodiments of the present invention.

FIG. 4A illustrates register states in OTQ 406 and an LS 407 used in another alternative embodiment of the present invention. Each register in OTQ 406 has an OPERATON_info field 405 and a LS_ptr field 404. Registers in LS 407 store addresses 408. CUR_LS_ptr 409 points to a register that is accessed during operations on OTQ 406 and LS 407. ALLOCATE_ptr 402 points to register positions in OTQ 406 where operations are to be added or "allocated" for tracking. DEALLOCATE_ptr 401 points to a register containing operations that have been committed and are to be "removed" (can be written over) from OTQ 406. FLUSH_ptr 412 points to the register containing the last operation in a sequence to be removed or flushed from OTQ 406 because the operations will not be committed in a normal execution. ALLOCATE_count 413 indicates the number of active operations in OTQ 406. Registers 410, 414 and 415 hold link stack correction information and are named, link stack correction address (LS_CORRECTION_addr) 410 register, link stack correction pointer (LS_CORRECTION_LS_ptr) register 411, and link stack correction valid (LS_CORRECTION_valid) register 415, respectively.

LS_CORRECTION_OTQ_ptr 414 is a pointer used in the algorithm enhancements of the embodiment in FIG. 4A.

Figure 4B:
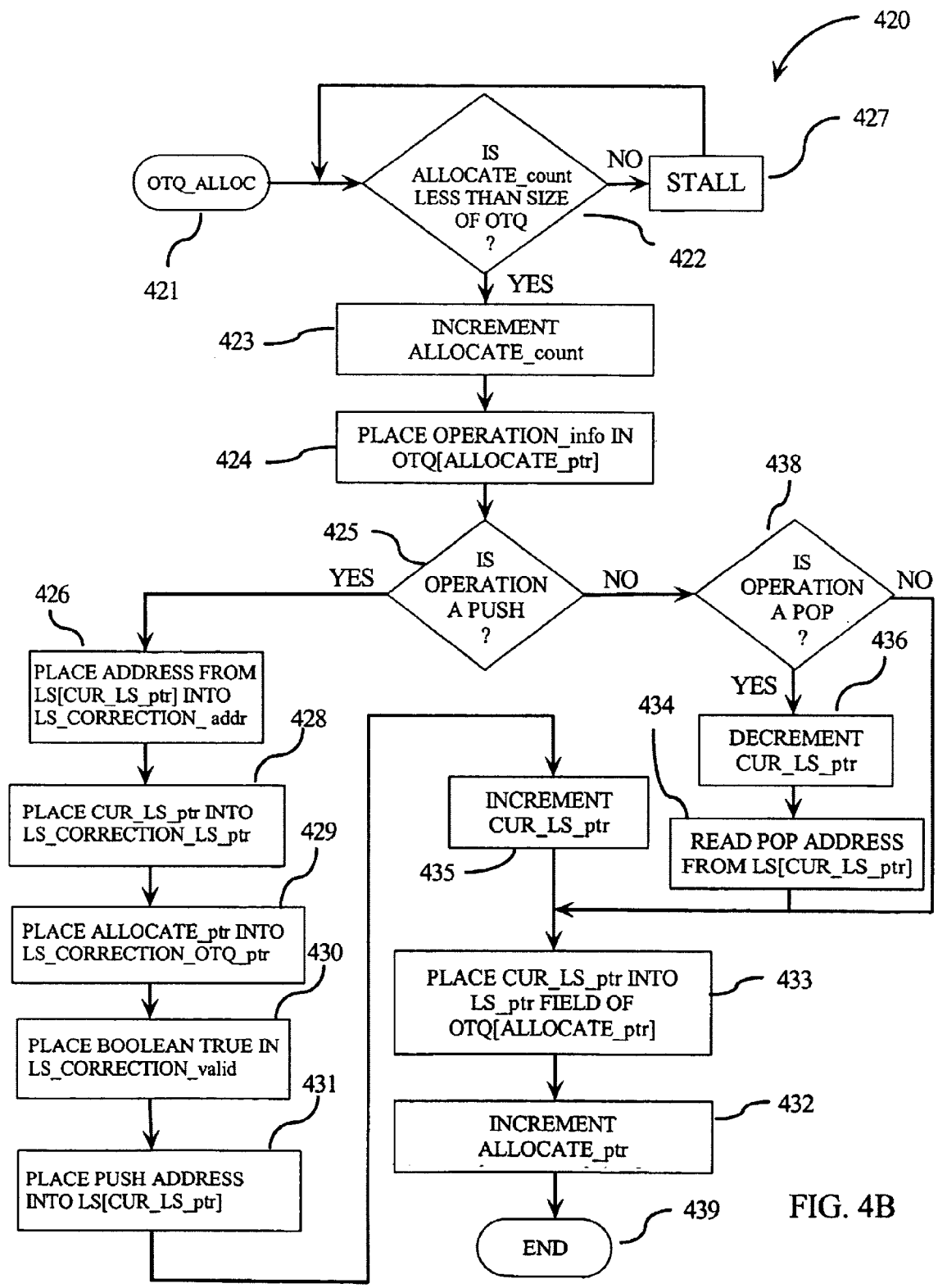
FIG. 4B illustrates an operation tracking queue and link stack algorithms used in alternate embodiments of the present invention.

FIG. 4B is a flow diagram of OTQ_ALLOC process 420 used to allocate operations to OTQ 406 in the embodiment of FIG. 4A. In step 421, OTQ_ALLOC 420 is called. Step 422 checks to see if OTQ 406 is full. If OTQ 406 is full, a wait is executed via a STALL in step 427 until an operation can be allocated. If OTQ 406 is not full in step 422, ALLOCATE_count 413 is incremented (indicating an operation is adding) by one. In step 424, operation information is placed in OPERATION_info field 405 of the register in OTQ 406 pointed to by ALLOCATE_ptr 402. The operation information has details of the instructions be tracked (e.g., instruction type and operand). The allocated operation is tested in step 425 to see if it is a PUSH operation. If the result of the test is YES in step 425, then in step 426 the PUSH address in the LS 407 register pointed to by CUR_LS_ptr 409 is placed in LS_CORRECTION_addr register 410. In step 428, CUR_LS_ptr 409 is placed in LS_CORRECTION_LS_ptr register 411. In step 429, ALLOCATE_ptr 402 is placed into LS_CORRECTION_OTQ_ptr 414. A boolean TRUE is placed in LS_CORRECTION_valid register 415 in step 430. In step 431, the address (PUSH address) is placed in the LS 407 register pointed to by CUR_LS_ptr 409. In step 435, CUR_LS_ptr 409 is incremented by one. CUR_LS_ptr 409 is placed into LS_ptr field 404 of OTQ 406 in step 433 and ALLOCATE_ptr 402 is incremented by one in step 432. An END awaiting a new operation is executed in step 439 completing OTQ_ALLOC 420.

Returning to step 425, if the operation in step 425 is not a PUSH, then a test to determine if the operation is a POP is done in step 438. If the result of the test is NO in step 438, the CUR_LS_ptr 409 is decremented by one in step 436 and the POP address is read from the register pointed to by CUR_LS_ptr 409 in step 434. After step 434, then steps 433, 432, and 439 are executed as in a PUSH operation of FIG. 4B. If in step 438 the operation is not a POP, then steps 433, 432 and 439 are executed as in a PUSH or POP operation of FIG. 4B.

Figure 4C:
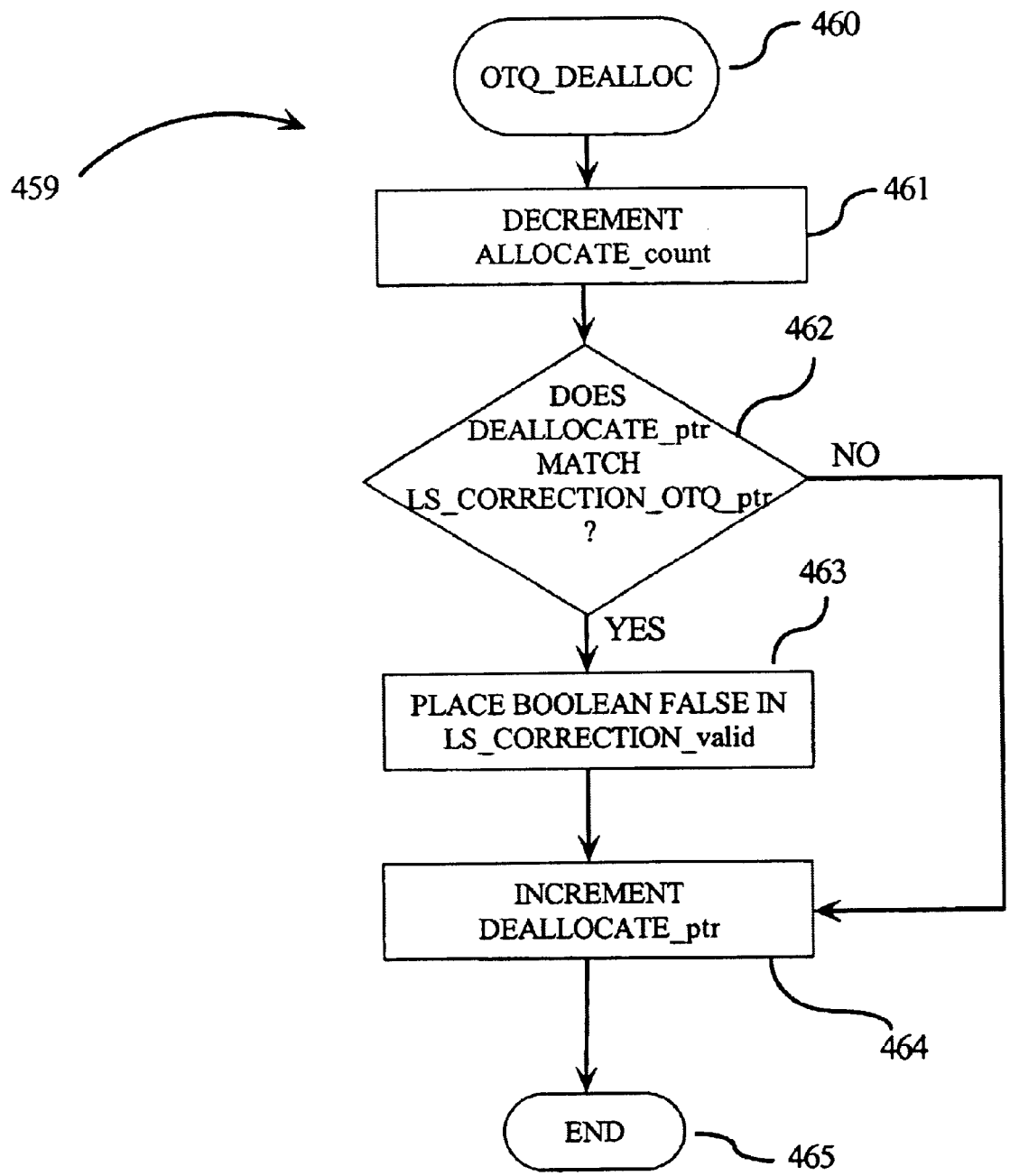
FIG. 4C illustrates another operation tracking queue and link stack algorithms used in alternate embodiments of the present invention.

FIG. 4C is a flow diagram of the OTQ_DEALLOC process 459 used in one operation of the embodiment of FIG. 4A. In step 460, an OTQ_DEALLOC 459 is called. In step 461, ALLOCATE_count 412 is decremented by one count. In step 462, a test is done to determine if DEALLOCATE_ptr 401 matches the value in LS_CORRECTION_OTQ_ptr 414. If there is a match in step 462, then a boolean FALSE is placed in LS_CORRECTION_valid register 415 and DEALLOCATE_ptr 401 is decremented by one in step 464. An END is executed in step 465 completing OTQ_DEALLOC 459. If in step 462 there is no match, then a branch to step 464 is executed and DEALLOCATE_ptr 401 is decremented by one. An END is executed in step 465 completing OTQ_DEALLOC 459.

Figure 4D:
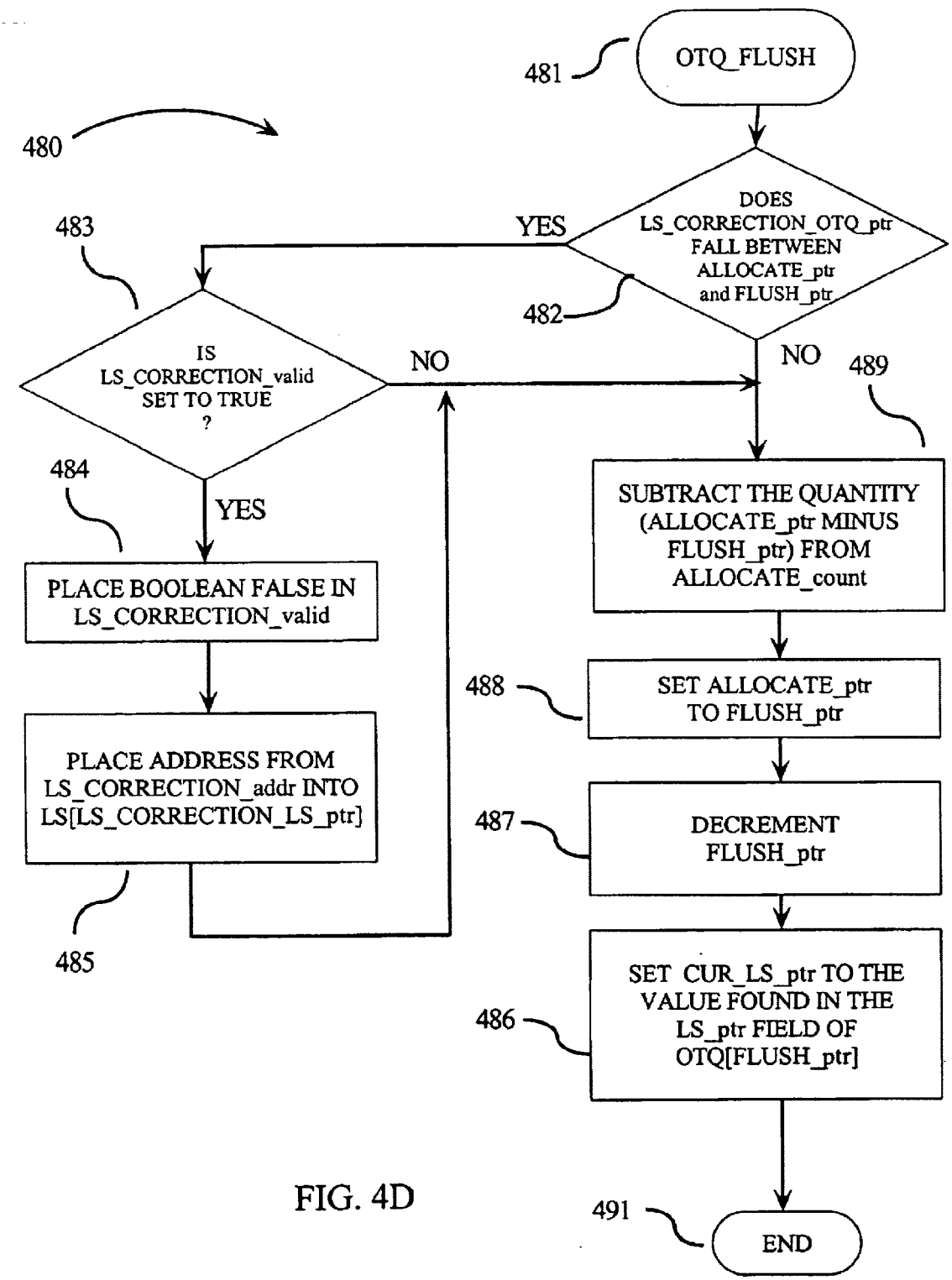
FIG. 4D illustrates another operation tracking queue and link stack algorithms used in alternate embodiments of the present invention.

FIG. 4D is a flow diagram an OTQ_FLUSH process 480used in the embodiment in FIG. 4A. In step 481, an OTQ_FLUSH 480 is called. In step 482, a test is done to determine if the value in LS_CORRECTION_OTQ_ptr 414 register falls between ALLOCATE_ptr 402 and FLUSH_ptr 412. If the test result in step 482 is YES, then a test in step 483 is done to determine if LS_CORRECTION_valid is set to a boolean TRUE. If the test result in step 483 is NO, then in step 489 the quantity ALLOCATE_ptr 402 minus FLUSH_ptr 412 is calculated and subtracted from ALLOCATE_count 413. In step 488, ALLOCATE_ptr 402 is set to FLUSH_ptr 412. FLUSH_ptr 412 is decremented by one in step 487. In step 486, CUR_LS_ptr 409 is set to the value in LS_ptr field 404 of the register in OTQ 406 pointed to by FLUSH_ptr 412. An END awaiting a next operation is executed in step 491 completing OTQ_FLUSH 480. If the test result in step 483 is YES, then a boolean FALSE is placed in LS_CORRECTION_valid register 415 in step 484. In step 485, the address in LS_CORRECTION_addr 410 is placed into the LS 407 register pointed to by the value in LS_CORRECTION_LS_ptr 411. Steps 489, 488, 487, 486 and 491 are then executed in sequence as described above completing OTQ_FLUSH 480.

Figure 4E:
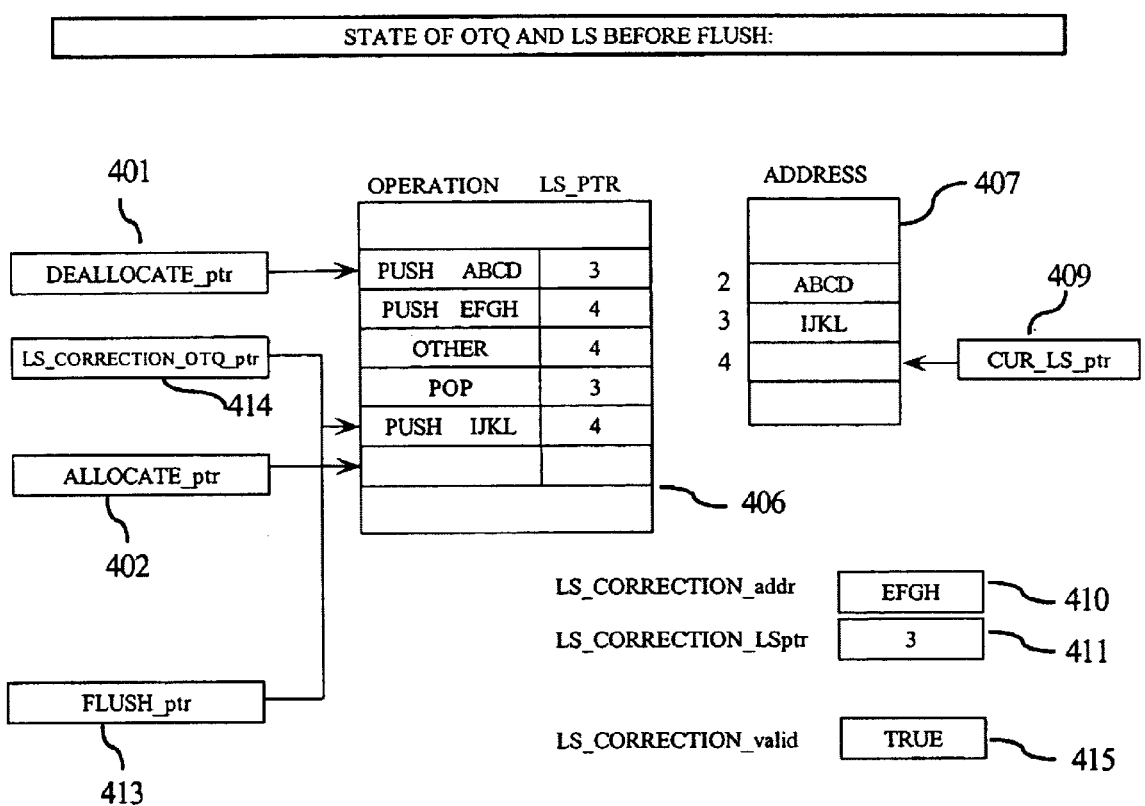
FIG. 4E illustrates an example of an operation tracking queue and link stack operation in alternate embodiments of the present invention.
Figure 4F:
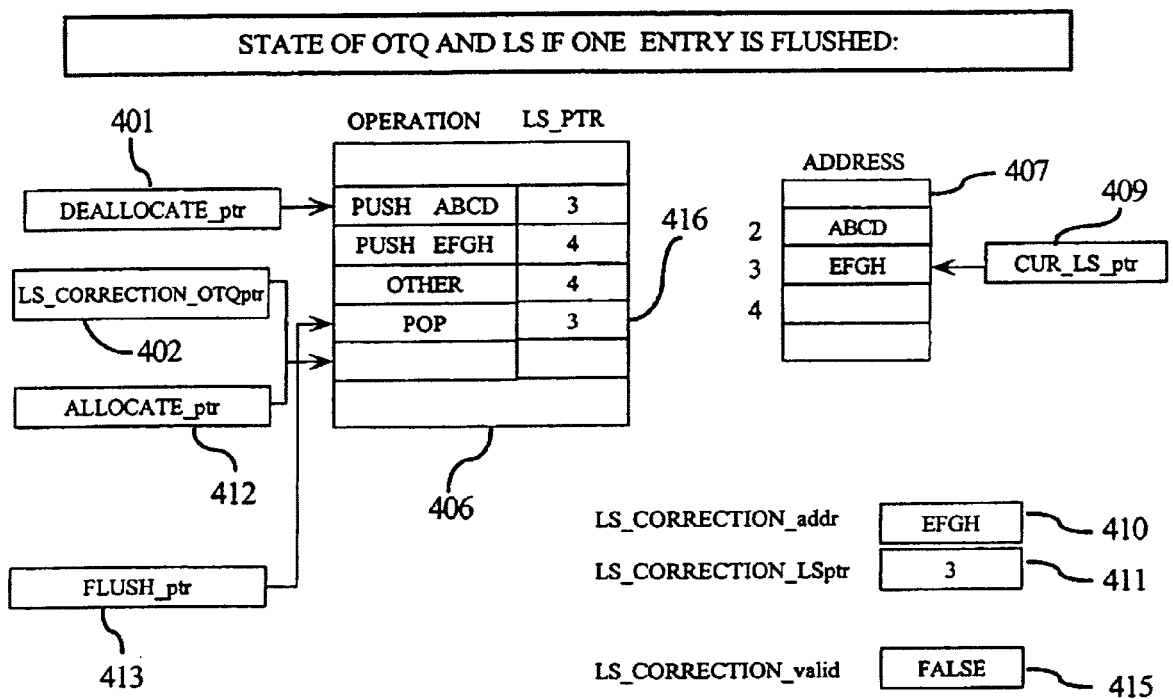
FIG. 4F illustrates another example of an operation tracking queue and link stack operation in alternate embodiments of the present invention.
Figure 4G:
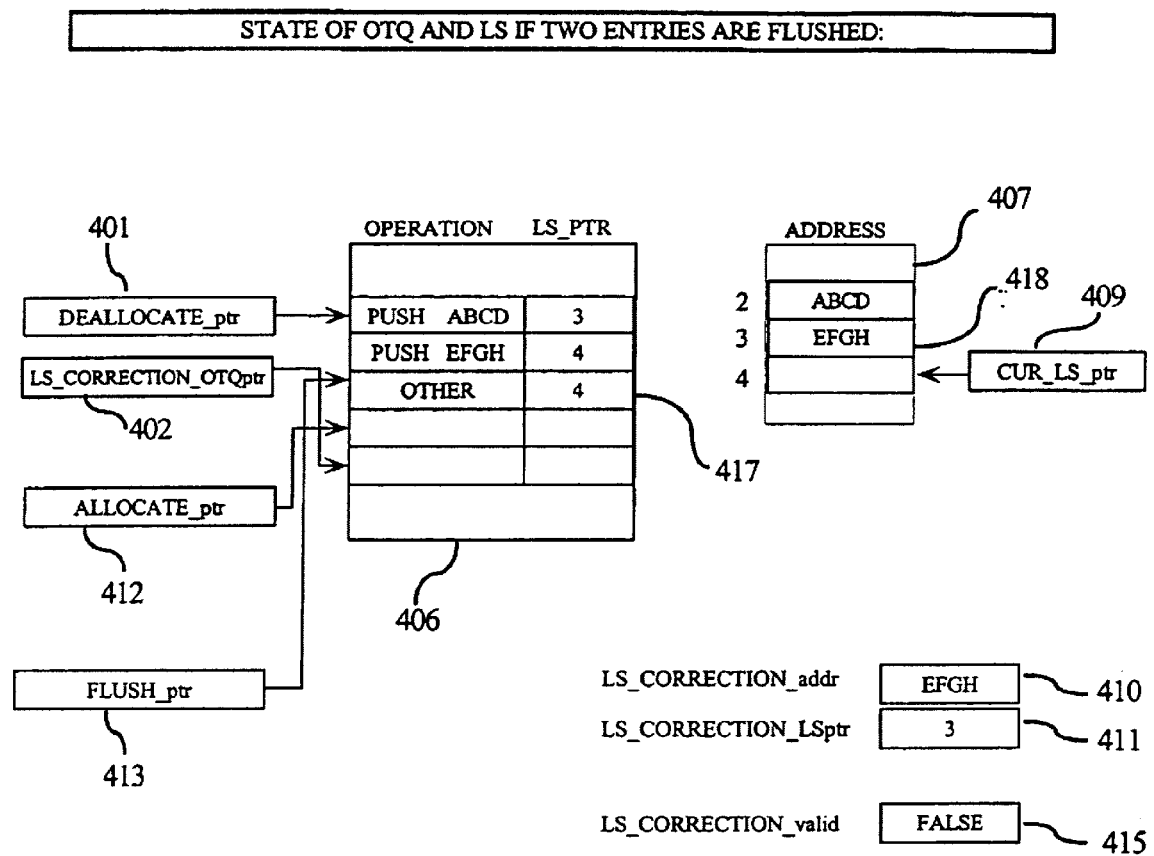
FIG. 4G illustrates another example of an operation tracking queue and link stack operation in alternate embodiments of the present invention.

FIGS. 4E–4G illustrate states of register fields in the embodiment of FIG. 4A. FIG. 4E illustrates the states of the register fields after an operation sequence PUSH ABCD, PUSH EFGH, OTHER, POP, and PUSH IJKL executed according to the method steps in FIGS. 4B and 4C. FIG. 4F illustrates the register states for a single entry FLUSH in accordance with OTQ_FLUSH process 480 in FIG. 4D. Referring to FIG. 4F, when a single entry FLUSH operation is executed on OTQ 406 and LS 407, LS_CORRECTION_OTQ_ptr will be pointing to the register containing the last PUSH operation and ALLOCATE_ptr 402 will be pointing to the next register position in which an allocated operation would be placed. Since the LS_CORRECTION_OTQ_ptr is between ALLOCATE_ptr 402 and FLUSH_ptr 413 (only one entry is to be flushed), the YES path from step 482 is taken. Since LS_CORRECTION_valid 415 is set to TRUE, it is switched to FALSE. Then the address from LS_CORRECTION_addr 410 is set into the LS 407 register pointed to by the LS_CORRECTION_LS_ptr 411. The address of flushed PUSH IJKL is replaced by the value in the LS_CORRECTION_addr register 410. A subsequent POP operation will now have a CUR_LSP_ptr 409 corrected and its corresponding address entry corrected by the value in LS_CORRECTION_addr register 410.

FIG. 4G illustrates the case where two entries are flushed from OTQ 406 of the embodiment of FIG. 4A. Since the LS_CORRECTION_OTQ_ptr is between ALLOCATE_ptr 402 and FLUSH_ptr 413, the YES path from step 482, in FIG. 4D, is executed. FLUSH_ptr 413 will be decremented by one and point to register 417 which has a LS_ptr field 404 containing LS_ptr 409 value "4". In this case, CUR_LS_ptr 409 will be decremented by one on a subsequent POP to point to register 418 which contains the PUSH address EFGH which was previously POPPED. This means that the speculated instruction resulting in the POP (EFGH) was not committed in the actual instruction execution stream and the address EFGH is may be still valid for a subsequent speculated instruction resulting in a POP. A subsequent PUSH will allocate a PUSH address to the register pointed to by CUR_LS_ptr 409 and the PUSH address EFGH will remain unless the PUSH EFGH is flushed. In this case, both the CUR_LS_ptr 409 and the entry are corrected.

Although the present invention and its advantages have been described in detail, it should be understood that various changes, substitutions and alterations can be made herein without departing from the spirit and scope of the invention as defined by the appended claims.

What is claimed is:

1. A method for managing a link stack comprising the steps of:

setting a first data value, corresponding to a portion of a first address stored in said link stack, into a first portion of an entry in a queue having a plurality of entries in response to a first type operation;

setting a current value of a first pointer of said link stack into a first register in response to a second type operation; and setting said current value of said first pointer into a second portion of said entry in said queue.

2. The method of claim 1 further comprising the steps of:

reading from said link stack a second address stored at a stack entry at said current value of said first pointer in response to said second type operation; and storing said second address in a second register.

3. The method of claim 2 further comprising the steps of:

receiving a pointer value in response to a pipeline flush operation, said pointer value operable for pointing into said queue; and setting a current pointer value of said first pointer to a value in said second portion of an entry in the queue pointed to by said pointer value.

4. The method of claim 3 further comprising the steps of:

retrieving a value from said second register; and comparing said value from said retrieving step with a value from said second portion of said entry in the queue pointed to by said pointer value.

5. The method of claim 4 further comprising the steps of:

in response to a compare match in said comparing step, comparing said current value of said first pointer with a data value in said first register; and in response to a match of said current value of said first pointer and said data value in said first register, setting said data value in said second register into said link stack at a location pointed to by said current value of said first pointer decremented by one.

6. The method of claim 2 further comprising the step of setting said first data value in a third register for said first type operation.

7. The method of claim 6 further comprising the step of setting a second data value from said second register in a said first portion of said entry in said queue in response to a third type operation.

8. The method of claim 1 wherein said first type operation is a "push" type operation and said second type operation is a "pop" type operation.

9. The method of claim 1 wherein said steps recited therein are performed in response to a fetch of an instruction using a corresponding one of said first type operation and said second type operation.

10. A data processing system comprising:

a central processing unit (CPU), said CPU including:

a link stack; and first logic operable for setting a first data value corresponding to a portion of a first address stored in said link stack into a first portion of an entry in a queue having a plurality of entries in response to a first type operation, and setting a current value of a first pointer into said link stack in a first register in response to a second type operation, and setting said current value of said first pointer in a second portion of said entry in said queue.

11. The system of claim 10 wherein said CPU further comprises, second logic operable for, for said second type operation, reading from said link stack a second address stored at a stack entry at said current value of said first pointer, and storing said second address in a second register.

12. The system of claim 11 wherein said CPU further comprises, third logic operable for setting said first data value in a third register for a first type operation.

13. The system of claim 12 wherein said CPU further comprises fourth logic operable for, for third type operation, setting a second data value from said second register in a said first portion of said entry.

14. The system of claim 11 wherein said CPU further comprises:

fifth logic operable for receiving a pointer value in response to a pipeline flush operation, said pointer value operable for pointing into said queue; and sixth logic operable for setting a current pointer value of said first pointer to a value in said second portion of an entry in the queue pointed to by said pointer value.

15. The system of claim 14 wherein said CPU further comprises:

seventh logic operable for retrieving a data value from said second register; and eighth logic operable for comparing said value from said retrieving step with a data value from said second portion of said entry in the queue pointed to by said pointer value.

16. The system of claim 15 wherein said CPU further comprises:

ninth logic operable for, in response to a match in said comparing step, comparing said current value of said first pointer with a data value in said first register; and tenth logic operable for, in response to a match of said current value of said first pointer and said data value in said first register, setting said data value in said second register into said link stack at a location pointed to by said current value of said first pointer decremented by one.

17. The system of claim 10 wherein said first type instruction is a "push" type operation and said second type operation is a "pop" type operation.

18. The system of claim 10 wherein said first logic sets said first data value, for said first type instruction, and sets said current value of said pointer, for said second type operation in response to a fetch of a corresponding one of said first type operation and said second type operation.

19. The system of claim 10 further comprising system memory coupled to said CPU, said system memory operable for storing a program of instructions including said first type operations and said second type operations.

* * * * *